United States Patent
Gordon

(10) Patent No.: US 7,416,666 B2
(45) Date of Patent: *Aug. 26, 2008

(54) MOBILE DESALINATION PLANTS AND SYSTEMS, AND METHODS FOR PRODUCING DESALINATED WATER

(75) Inventor: Andrew W. Gordon, Boca Raton, FL (US)

(73) Assignee: Water Standard Company, Houston, TX (US)

( * ) Notice: Subject to any disclaimer, the term of this patent is extended or adjusted under 35 U.S.C. 154(b) by 366 days.

This patent is subject to a terminal disclaimer.

(21) Appl. No.: 10/734,050

(22) Filed: Dec. 11, 2003

(65) Prior Publication Data

US 2004/0206681 A1 Oct. 21, 2004

Related U.S. Application Data

(63) Continuation-in-part of application No. 10/630,351, filed on Jul. 30, 2003.

(60) Provisional application No. 60/505,341, filed on Jun. 3, 2003, provisional application No. 60/416,907, filed on Oct. 8, 2002.

(51) Int. Cl.
*B01D 61/02* (2006.01)
*B01D 63/00* (2006.01)
*B01D 61/00* (2006.01)

(52) U.S. Cl. .............. 210/257.2; 210/321.76; 210/321.85; 210/170; 210/258; 210/747; 210/650; 210/652

(58) Field of Classification Search .............. None
See application file for complete search history.

(56) References Cited

U.S. PATENT DOCUMENTS

| 3,171,808 A | 3/1965 | Todd |
| 3,365,061 A | 1/1968 | Bray |
| 3,456,802 A | 7/1969 | Cole |
| 3,632,505 A | 1/1972 | Nelson |
| 3,841,976 A | 10/1974 | Scott et al. |
| 4,071,445 A | 1/1978 | Katayama et al. |
| 4,125,463 A | 11/1978 | Chenoweth |
| 4,134,732 A | 1/1979 | Jackson |
| 4,141,825 A | 2/1979 | Conger |

(Continued)

FOREIGN PATENT DOCUMENTS

CA 1050899 3/1979

(Continued)

OTHER PUBLICATIONS

Pacenti, P., et al., "Deployment of a submarine reverse osmosis desalination prototype plant (RODSS): field tests and preliminary technical evaluations," CAS Section-161; CAS Subsection-004, vol. 138, No. 1-3, pp. 181, 2001 Elsevier Science B. V., (Abstract Only).

(Continued)

*Primary Examiner*—Krishnan S Menon
(74) *Attorney, Agent, or Firm*—Osha-Liang LLP

(57) ABSTRACT

Systems, methods, and apparatus for desalinating water are provided. A vessel includes a water intake system, a reverse osmosis system, a concentrate discharge system, a permeate transfer system, a power source, and a control system. The concentrate discharge system includes a plurality of concentrate discharge ports.

19 Claims, 24 Drawing Sheets

U.S. PATENT DOCUMENTS

| | | | |
|---|---|---|---|
| 4,161,445 A | 7/1979 | Coillet | |
| 4,169,789 A | 10/1979 | Lerat | |
| 4,335,576 A | 6/1982 | Hopfe | |
| 4,341,629 A | 7/1982 | Uhlinger | |
| 4,421,461 A | 12/1983 | Hicks et al. | |
| 4,452,696 A | 6/1984 | Lopez | |
| 4,526,494 A | 7/1985 | Eicher | |
| 4,814,086 A | 3/1989 | Bratt | |
| 4,993,348 A | 2/1991 | Wald | |
| 5,098,575 A | 3/1992 | Yaeli | |
| 5,229,005 A | 7/1993 | Fok et al. | |
| 5,830,366 A * | 11/1998 | Husick | 210/739 |
| 5,840,159 A | 11/1998 | Rosenblad | |
| 5,972,216 A | 10/1999 | Acernese et al. | |
| 5,997,737 A | 12/1999 | Sturdevant et al. | |
| 6,076,364 A | 6/2000 | Stripp | |
| 6,185,940 B1 | 2/2001 | Prueitt | |
| 6,190,556 B1 | 2/2001 | Uhlinger | |
| 6,240,867 B1 | 6/2001 | Hoyle et al. | |
| 6,299,766 B1 * | 10/2001 | Permar | 210/195.2 |
| 6,348,148 B1 | 2/2002 | Bosley | |
| 6,363,873 B2 | 4/2002 | Thomas | |
| 6,375,842 B1 | 4/2002 | Graham | |
| 6,574,979 B2 | 6/2003 | Faqih | |
| 6,613,232 B2 | 9/2003 | Chesner et al. | |
| 6,658,889 B2 * | 12/2003 | Krylov | 62/544 |
| 6,923,901 B2 | 8/2005 | Leffler et al. | |
| 6,991,722 B2 | 1/2006 | Max | |
| 2002/0060192 A1 | 5/2002 | Max | |
| 2002/0125190 A1 | 9/2002 | Bosley | |
| 2002/0155047 A1 | 10/2002 | Max | |
| 2002/0189987 A1 | 12/2002 | Wagner | |
| 2003/0159457 A1 | 8/2003 | Faqih | |
| 2004/0026225 A1 | 2/2004 | Domen | |
| 2005/0126999 A1 | 6/2005 | Rawson et al. | |
| 2005/0230299 A1 | 10/2005 | Saho et al. | |
| 2006/0157410 A1 | 7/2006 | Hassan | |
| 2006/0196836 A1 | 9/2006 | Arakel et al. | |
| 2007/0029255 A1 | 2/2007 | D'Amato et al. | |

FOREIGN PATENT DOCUMENTS

| | | |
|---|---|---|
| DE | 19546587 | 6/1997 |
| DE | 19640460 | 4/1998 |
| DE | 19734981 | 6/1998 |
| DE | 10211788 | 10/2003 |
| DE | 10219083 | 11/2003 |
| EP | 0 959 048 A | 11/1999 |
| EP | 0968755 | 1/2000 |
| EP | 1159049 | 12/2001 |
| EP | 1 199 098 A1 | 4/2002 |
| EP | 1350766 | 10/2003 |
| EP | 1614660 | 1/2006 |
| EP | 1614661 | 1/2006 |
| GB | 1 233 005 | 6/1967 |
| GB | 1319236 | 6/1973 |
| GB | 2068774 | 8/1981 |
| GB | 2377928 | 1/2003 |
| JP | 57135084 | 8/1982 |
| JP | 59177189 | 10/1984 |
| JP | 0925624 | 1/1997 |
| KR | 20010079432 | 8/2001 |
| NZ | 0519728 | 10/2004 |
| WO | WO9631436 | 10/1996 |
| WO | WO9718166 | 5/1997 |
| WO | WO9733832 | 9/1997 |
| WO | WO9823361 | 6/1998 |
| WO | WO0054866 | 9/2000 |
| WO | WO 02/068338 A2 | 9/2002 |
| WO | WO03/013704 | 2/2003 |
| WO | WO2004043576 | 5/2004 |
| WO | WO2005012180 | 2/2005 |
| WO | WO2005119007 | 12/2005 |
| WO | WO2006006942 | 1/2006 |
| WO | WO2006021796 | 3/2006 |
| WO | WO2006125263 | 11/2006 |
| WO | WO2006130758 | 12/2006 |

OTHER PUBLICATIONS

Lampe, Harald, et al., "PCS—Preussag Conversion System. RTM. Mobile floating seawater desalination plant," CAS Section-161; CAS Subsection-004; vol. 114, pp. 145-151, 1997 Elsevier Science B. V.

Yang, Yanzhou, "RO Plants in Marine Desalination for ships and Submarines," Shuichuli Jishu, 1994, vol. 20, Iss. 2, pp. 105-109, CAS Section-161; CAS Subsection-004.

Galloway, M. et al. "UF for seawater RO pretreatment"; 2003, pp. 1-12, American Water Works Association Membrane Technology Conference.

Reali, M., et al., "Submarine and underground reserve osmosis schemes for energy-efficient seawater desalination," Desalination, 1997, pp. 269-275, vol. 109, No. 3, ENEL SpA (DSR-CRIS), Milano, Spain.

Pizzino, Joseph F., "Operation of a 2000 Gallon per day Reverse Osmosis Desalination System Aboard MONOB (YAG-610)", 1979, 28 pages, Citations from *Energy Science and Technology (DOE): EDB*.

Humphries, J. R. et al., "A floating desalination/co-generation system using the KLT-40 reactor and Canadian RO desalination technology"; 2000, pp. 41-52.

Panov, Yu, "Equipment and materials for coupling interfaces of a nuclear reactor with desalination and heating plants based on floating NHPS;" Nuclear heat applications: Design aspects and operating experience, IAEA-TECDOC-1056, Vienna (1995-1998), pp. 249-262.

Mitenkov, F. M., et al., "Floating nuclear power—Desalination complex using a nuclear power plant of the KLT-40 type and the reverse osmosis process," 1997, pp. 255-268, IAEA, Vienna, Austria.

Panov, Yu., et al., "Use of reaction plants of enhanced safety for sea water desalination, industrial and district heating"; Conference Advisory group meeting on non-electric application of nuclear energy, Jakarta, Indonesia, 1997, pp. 281-293 Citations from *Engineering Index; EIX*.

Pacenti, Paolo, et al., "Submarine seawater reverse osmosis desalination system"; Conference Proceedings of the 1999 European Conference on Desalination and the Environment, Las Palmas, Spain, 1999, p. 213-218.

Peters, Thomas A., "Desalination of seawater and brackish water with reserve osmosis and the disc tube module DT"; Conference Proceedings of the 1999 WSTA Fourth Gulf Water Conference, Manama, Bahrain, Oct. 10, 1999, p. 149-155.

Columbo, D., et al., Energy-efficient submarine desalination plant,"Conference Proceedings of the 1998 International Workshop on Desalination Technologies or Small and Medium Size Plants with Limited Environmental Impact" Rome, Italy, 1999, pp. 171-176.

Vega, Luis A., "Economics of ocean thermal energy conversion (OTEC)," IEEE Journal of Solid-State Circuits, 1992, pp. 152-181, Pacific Intl. Cntr. for High Technology Research, Honolulu, HI.

Pizzino, Joseph F., et al., Reverse osmosis for surface ship desalination. An overview, Naval Engineers Journal, May 1991, pp. 126-135, David Taylor Research Center, Annapolis, MD.

Vigo, F., et al., "Suitability of reverse osmosis membranes for energy recovery by submarine osmotic power plants," Desalination, 1986, pp. 45-57, vol. 60, No. 1, Inst. Ind. Chem. Univ. Genoa, Italy.

Rose, C. D., "Current Design and application of marine evaporators," Marine Tech., Oct. 1983, vol. 20, No. 4, pp. 348-355.

"Desalination Ship" Pamphlet prepared by Advanced Environmental Water Technologies, Inc.

PCT Search Report—mailed Jul. 9, 2004.

* cited by examiner

US 7,416,666 B2

MOBILE DESALINATION PLANTS AND SYSTEMS, AND METHODS FOR PRODUCING DESALINATED WATER

CLAIM FOR PRIORITY

This application is a continuation-in-part of U.S. patent application Ser. No. 10/630,351, filed Jul. 30, 2003, which claims priority to U.S. Provisional Application No. 60/416,907, filed Oct. 8, 2002, and to U.S. patent application Ser. No. 10/453,206, filed Jun. 3, 2003, and converted to U.S. Provisional Application No. 60/505,341, on Jun. 3, 2003, the priority benefit each of which is claimed by this application, and each of which is incorporated in its entirety herein by reference.

FIELD OF THE INVENTION

The present invention relates to systems, methods and apparatus for providing filtered water. Embodiments include systems, methods and apparatus for water desalination and purification including the removal of dissolved solids and contaminants from sea water and brackish water. Systems of the present invention may be advantageously utilized to provide potable, or otherwise purified water, from a seawater or brackish water source.

BACKGROUND

The antiquity of water supply systems is well established. The practice of water treatment dates back to at least 2000 B.C., when Sanskrit writings on medical lore recommended storage of water in copper vessels, exposure of water to sunlight, filtering through charcoal, and boiling of foul water for the purpose of making water drinkable.

Later, two significant advancements helped to establish drinking water treatment. In 1685, the Italian physician Lu Antonio Porzio designed the first multiple-stage filter. Prior to that, in 1680, the microscope was developed by Anton Van Leeuwenhoek. With the discovery of the microscope enabling the detection of microorganisms and the ability to filter out these microorganisms, the first water-filtering facility was built in the town of Paisley, Scotland, in 1804 by John Gibb. Within three years, filtered water was piped directly to customers in Glasgow, Scotland.

In 1806, a large water treatment plant began operating in Paris with filters made of sand and charcoal, which had to be renewed every six hours. Pumps were driven by horses working in three shifts. Water was then settled for twelve hours before filtration.

In the 1870's, Dr. Robert Koch and Dr. Joseph Lister demonstrated that microorganisms existing in water supplies can cause disease, and then began the quest for effective ways to treat raw water. In 1906, in eastern France, ozone was first used as a disinfectant. A few years later, in the United States, the Jersey City waterworks in 1908 became the first utility in America to use sodium hypochlorite for disinfecting the water supply. Also, in that same year, the Bubbly Creek Plant in Chicago, Ill., instituted chlorine disinfectant. Over the next several decades, work began on improving the efficiency of filtration and disinfectant.

By the 1920's, the filtration technology had evolved so that pure, clean, bacteria free, sediment free, and particulate free water was available. During World War II, Allied military forces operated in arid areas and began ocean water desalination in order to supply troops with fresh drinking water. In 1942, the U.S. Public Health Service adopted the first set of drinking water standards, and the membrane filter process for bacteriological analysis was approved in 1957.

By the early 1960's, more than 19,000 municipal water systems were in operation throughout the United States. With the 1974 enactment of the Safe Drinking Water Act, the federal government, the public health community and water utilities worked together to provide secure water production for the United States.

The world has a shortage of potable water for drinking and water for agricultural, irrigation, and industrial use. In some parts of the world, prolonged drought and chronic water shortages have slowed economic growth and may eventually cause the abandonment of certain population centers. In other parts of the world, an abundance of fresh water exists, but the water is contaminated with pollution such as chemicals from industrial sources and from agricultural practices.

The world faces severe challenges in our ability to meet our future water needs. Today there are over 300 million people living in areas with severe water shortages. That number is expected to increase to 3 billion by 2025. About 9,500 children die around the world each day because of poor quality drinking water according to United Nations reports. The population growth has increased the demand on drinking water supplies, while the available water, world wide, has not changed. In the coming decades, in addition to improving water reuse efficiency and promoting water conservation, we will need to make additional water resources at a cost and in a manner that supports urban, rural and agricultural prosperity and environmental protection.

There has been a 300 percent increase in water use over the past 50 years. Every continent is experiencing falling water tables, particularly on the southern Great Plains and the Southwest in the United States, and in North Africa, Southern Europe, the entire Middle East, Southeastern Asia, China and elsewhere.

Evaporation and reverse osmosis are two common methods to produce potable water from sea water or brackish water. Evaporation methods involve heating sea water or brackish water, condensing the water vapor produced, and isolating the distillate. Reverse osmosis is a membrane process in which solutions are desalted or purified using relatively high hydraulic pressure as the driving force. The salt ions or other contaminants are excluded or rejected by the reverse osmosis membrane while pure water is forced through the membrane. Reverse osmosis can remove approximately 95% to approximately 99% of the dissolved salts, silica, colloids, biological materials, pollution, and other contaminants in water.

The only inexhaustible supply of water is the sea. The desalination of sea water using a land-based plant in quantities large enough to supply a major population center or large scale irrigation projects presents many problems. Land-based plants that desalinate sea water through evaporation methods consume enormous amounts of energy.

Land-based plants that desalinate water through reverse osmosis methods generate enormous quantities of effluent comprising the dissolved solids removed from the sea water. This effluent, also referred to as concentrate, has such a high concentration of salts, such as sodium chloride, sodium bromide, etc., and other dissolved solids that simply discharging the concentrate into the waters surrounding a land-based desalination plant would eventually kill the surrounding marine life and damage the ecosystem. In addition, the concentrate that emerges from conventional land based reverse osmosis desalination plants has a density greater than sea water, and hence, the concentrate sinks and does not quickly mix when conventionally discharged directly into the water surrounding a land-based plant.

Even if the health of the marine life and ecosystem surrounding a land-based reverse osmosis desalination plant was not a concern, discharging the concentrate into the water surrounding the land-based plant would eventually raise the salinity of the intake water for the plant and foul the membranes of the reverse osmosis system. If a membrane in a reverse osmosis system is heavily fouled, it must be removed and treated to eliminate the fouling material. In extreme cases, the fouling material cannot be removed, and the membrane is discarded.

As a result of all of these factors, potable water produced from land-based reverse osmosis desalination plants is costly and presents significant engineering problems for disposing of the effluent. Hence, despite the world's shortage of potable water, only a small percentage of the world's water is produced by the desalination or purification of water using reverse osmosis methods. Therefore, the need exists for a method and system to consistently and reliably supply potable water using desalination technology that does not present the engineering and environmental problems that a conventional land-based desalination plant presents.

Known ship-board water desalination systems are designed and operated for ship-board consumption of water, and thus are designed and operated according to various maritime standards. Maritime standards for water desalination systems and plants and water quality are less stringent than the standards governing the design and operation of land-based desalination plants and systems, especially those promulgated by the United States, United Nations, and World Health Organization. With the world's increasing shortage of potable water, a need exists to alleviate this shortage. Therefore, there is a demonstrable need for methods and systems that can be utilized at sea to provide desalinated water for land-based consumption. Moreover, the desalinated water produced at sea can be stored, maintained, and transported in a manner consistent with those regulations and standards governing the design and operation of land-based water desalination plants and systems.

SUMMARY

The present invention overcomes the aforementioned disadvantages of the prior art and provides systems, apparatus and methods for providing water. A system of the present invention may be advantageously utilized to provide potable water, drinking water, and/or water for industrial uses.

Systems of the present invention comprise a vessel. The vessel includes systems, methods and apparatus for purifying and/or desalinating the water on which the vessel floats, including brackish and/or polluted sea, lake, river, sound, bay, estuary, lagoon water, etc. Water produced on the vessel may be delivered to land through the use of transport vessels, pipes, transfer ports and the like. The water may be transferred in bulk form and/or may be packaged in containers prior to transport. The water may be stored on the production vessel, accompanying vessels, and/or other storage means prior to transport to land.

Methods of the present invention include vessel production of water, including potable water or water suitable for residential, industrial, or agricultural uses, on the vessel and subsequent transportation of the water to land. The methods may further comprise storage and/or packaging of the water.

Apparatus of the present invention include the vessel and associated apparatus for producing, transporting, storing, refreshing, and/or packaging the water. Embodiments of apparatus of the present invention are described in detail herein. Systems and methods of the present invention may employ an apparatus of the present invention and/or may utilize other apparatus or equipment.

Embodiments of the present invention may take a wide variety of forms. In one exemplary embodiment, a vessel includes a water intake system, a reverse osmosis system, a concentrate discharge system, a permeate transfer system, a power source, and a control system. The water intake system includes a water intake and a water intake pump. The reverse osmosis system includes a high pressure pump and a reverse osmosis membrane. The concentrate discharge system includes a plurality of concentrate discharge ports. The permeate transfer system includes a transfer pump. The reverse osmosis system is in communication with the water intake system. The concentrate discharge system and the permeate transfer system are in communication with the reverse osmosis system. The power source is in communication with the pumps of the water intake system, the reverse osmosis system, and the permeate transfer system. The control system is in communication with the water intake system, the reverse osmosis system, the concentrate system, the permeate transfer system, and the power source.

In a further exemplary embodiment, a method of producing permeate on a floating structure includes the production of a concentrate that is discharged into the surrounding water. The concentrate is discharged through a concentrate discharge system that includes a plurality of concentrate discharge ports.

In another exemplary embodiment, a system includes a first vessel having means for producing a permeate and means for mixing a concentrate with seawater and means for delivering the permeate from the first vessel to a land-based distribution system.

In another exemplary embodiment, a system for providing disaster relief services from a maritime environment includes a first vessel and means for delivering desalinated water to shore. The first vessel is operable to produce desalinated water.

In yet another exemplary embodiment, a system for mitigating environmental impacts of a desalination system of a vessel (producing a permeate and a concentrate) on a maritime environment includes means for regulating a salinity level of the concentrate solution discharged from the vessel into the surrounding body of water and means for regulating a temperature of the concentrate to substantially equal the temperature of the water surrounding the vessel.

In still another exemplary embodiment, a method includes providing a first vessel operable to produce a permeate and to mix a concentrate and delivering the permeate from the first vessel to a land-based distribution system.

In a further exemplary embodiment, a method of providing relief to a disaster-stricken area includes providing a first vessel operable to produce desalinated water and delivering the desalinated water to shore. The first vessel includes a first tonnage.

In a further exemplary embodiment, a method of mitigating environmental impacts of desalinating water (the process of desalinating water produces a permeate and a concentrate) includes reducing the salinity level of the concentrate and regulating a temperature of the concentrate to substantially equal the temperature of the water proximate the area of the concentrate discharge.

In a further exemplary embodiment, a system comprises a vessel comprising means for producing energy and land-based means for transferring the energy from the vessel to a land-based distribution system.

In a further exemplary embodiment, a system comprises a vessel operable to produce desalinated water, means for delivering the desalinated water from the vessel to a land-based water distribution system, and means for transferring the electricity from the vessel to a land-based electrical distribution system.

In a further exemplary embodiment, a vessel comprises a hull comprising a first surface and a second surface, means for producing desalinated water, means for mixing a concentrate with seawater, and means for storing the desalinated water. The water storing means comprises a tank disposed within the hull. The tank comprises a first surface and a second surface. The second surface of the tank being separated from the first surface of the hull.

In a further exemplary embodiment, a method comprises providing a vessel operable to generate energy and transferring the energy from the vessel to a land-based distribution system.

In a further exemplary embodiment, a method comprises providing a vessel operable to produce desalinated water and to generate electricity, delivering the desalinated water produced by the vessel to a land-based water distribution network, and transferring the electricity generated by the vessel to a land-based electrical distribution network.

In still a further exemplary embodiment, a method comprises producing desalinated water, mixing a concentrate with seawater, and storing the desalinated water in a tank. The tank is disposed in a hull of a vessel. The hull comprises a first surface and a second surface. The tank comprises a first surface and a second surface. The second surface of the tank is separated from the first surface of the hull.

An advantage of the present invention can be to use a drought-resistant source of water.

Another advantage of the present invention can be to provide a sea-borne desalination facility that is less expensive than a land-based desalination facility.

Another advantage of the present invention can be to provide a more secure desalination facility.

Another advantage of the present invention can be to mitigate the environmental impacts of a desalination facility.

Another advantage of the present invention can be to discharge a concentrate solution having a salinity level substantially equal to a salinity level of the water surrounding the desalination facility.

Another advantage of the present invention can be to discharge a concentrate having a temperature substantially equal to a temperature of the water surrounding the desalination facility.

Another advantage of the present invention can be to provide large quantities of desalinated water to coastal and maritime locales anywhere in the world or to locales distant from a body of water through the use of a distribution system.

Another advantage of the present invention can be to provide relief to disaster-stricken areas.

Another advantage of the present invention can be to provide mobile production and storage of desalinated water.

Another advantage of the present invention can be to minimize the amount of land-based infrastructure.

Another advantage of the present invention can be to provide a desalination facility in a shorter amount of time than is needed for a land-based desalination facility.

Another advantage of the present invention can be to provide a desalination facility that can be moved to avoid natural disruptions and calamities.

Another advantage of the present invention can be to deliver emergency supplies and pre-packaged water.

Another advantage of the present invention can be to remediate aquifers and wetlands.

Another advantage of the present invention can be to provide a Federal strategic water reserve system.

Another advantage of the present invention can be to provide tradable and transportable water surpluses.

Another advantage of the present invention can be to provide a modular water-plant design that can be upgraded and modified.

Another advantage of the present invention can be to deliver electricity to areas suffering from an acute shortage of power.

Another advantage of the present invention can be to generate and transfer electricity to shore while off-loading desalinated water from a vessel.

Another advantage of the present invention can be to vary the amount of desalinated water provided to a location by substituting differently-sized vessels and/or plants.

Another advantage of the present invention can be to readily relocate the location of a source of intake water and/or the discharge of concentrate, as desired.

A further advantage of the present invention can be to produce, store and maintain water aboard a vessel consistent with the standards and requirements of land-based desalination systems and plants.

Another advantage of the present invention can be to reduce or eliminate uptake of water containing discharged concentrate into a water intake system.

BRIEF DESCRIPTION OF THE DRAWINGS

The accompanying drawings, which constitute part of this specification, help to illustrate embodiments of the invention. In the drawings, like numerals are used to indicate like elements throughout.

DETAILED DESCRIPTION

Figure 1A:
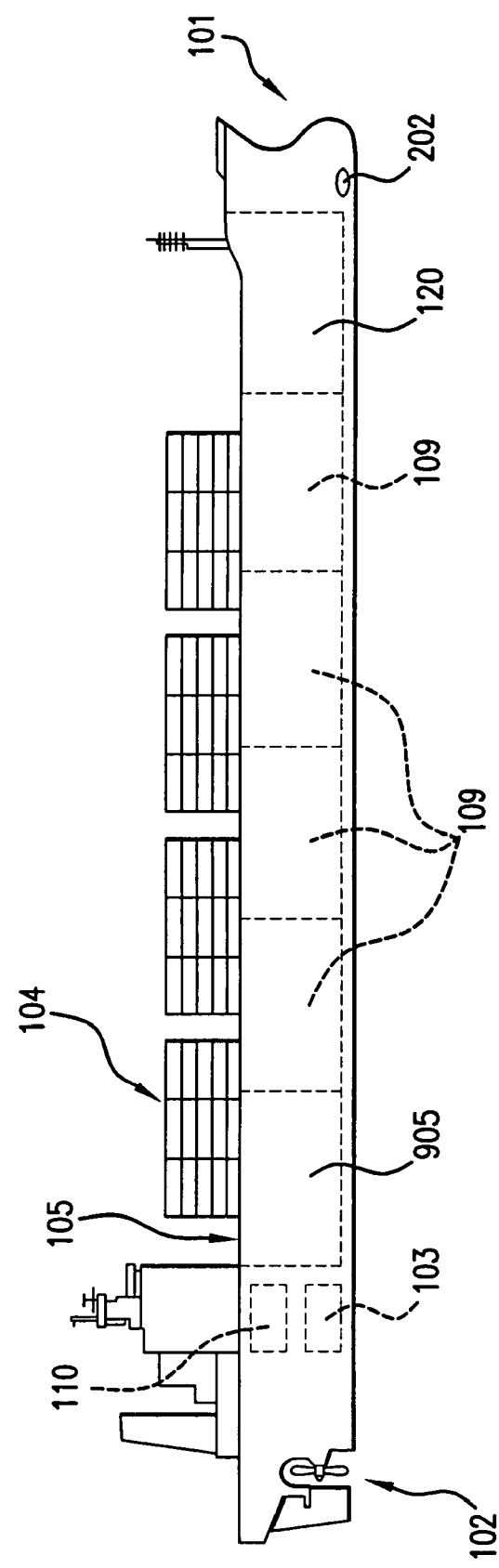
FIG. 1A is an side view of a vessel according to an embodiment of the present invention.

The present invention provides systems, methods and apparatus for producing water.

In an embodiment a system of the present invention comprises: a water production vessel and a distribution system for distributing the water produced to end users. The distribution system may comprise apparatus for pumping, piping, storing, transporting, packaging or otherwise distributing the water produced on the vessel.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

Embodiments of the present invention comprise systems, methods and apparatus for desalinating water from sea water, brackish, and/or polluted water. The systems, methods, and apparatus for desalinating water described herein can generally be operable to be utilized at sea, aboard a vessel, to provide desalinated water consistent with the standards and requirements generally imposed on land-based water desalination plants and systems. The invention described herein, however, is not limited to sea-based applications, but is provided as one such embodiment.

Figure 1B:
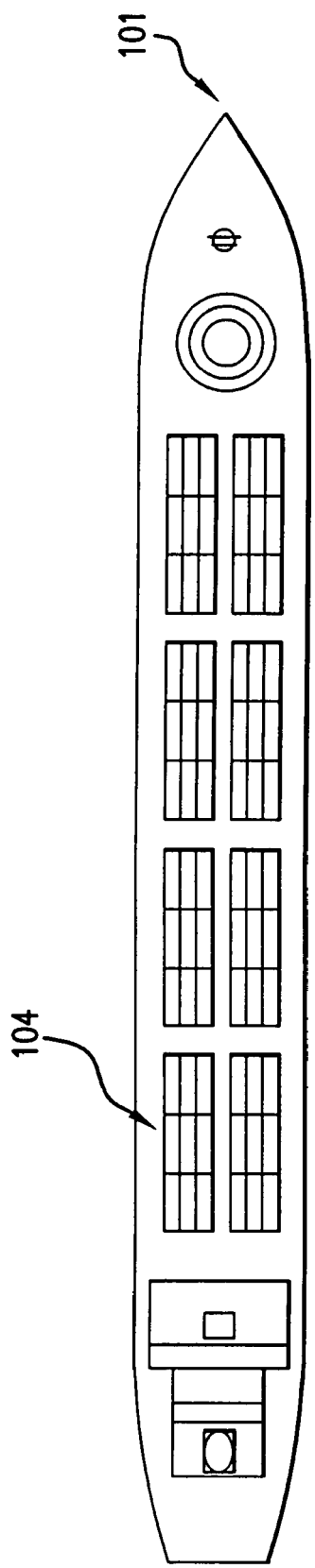
FIG. 1B is a plan view of the vessel of FIG. 1B.
Figure 2:
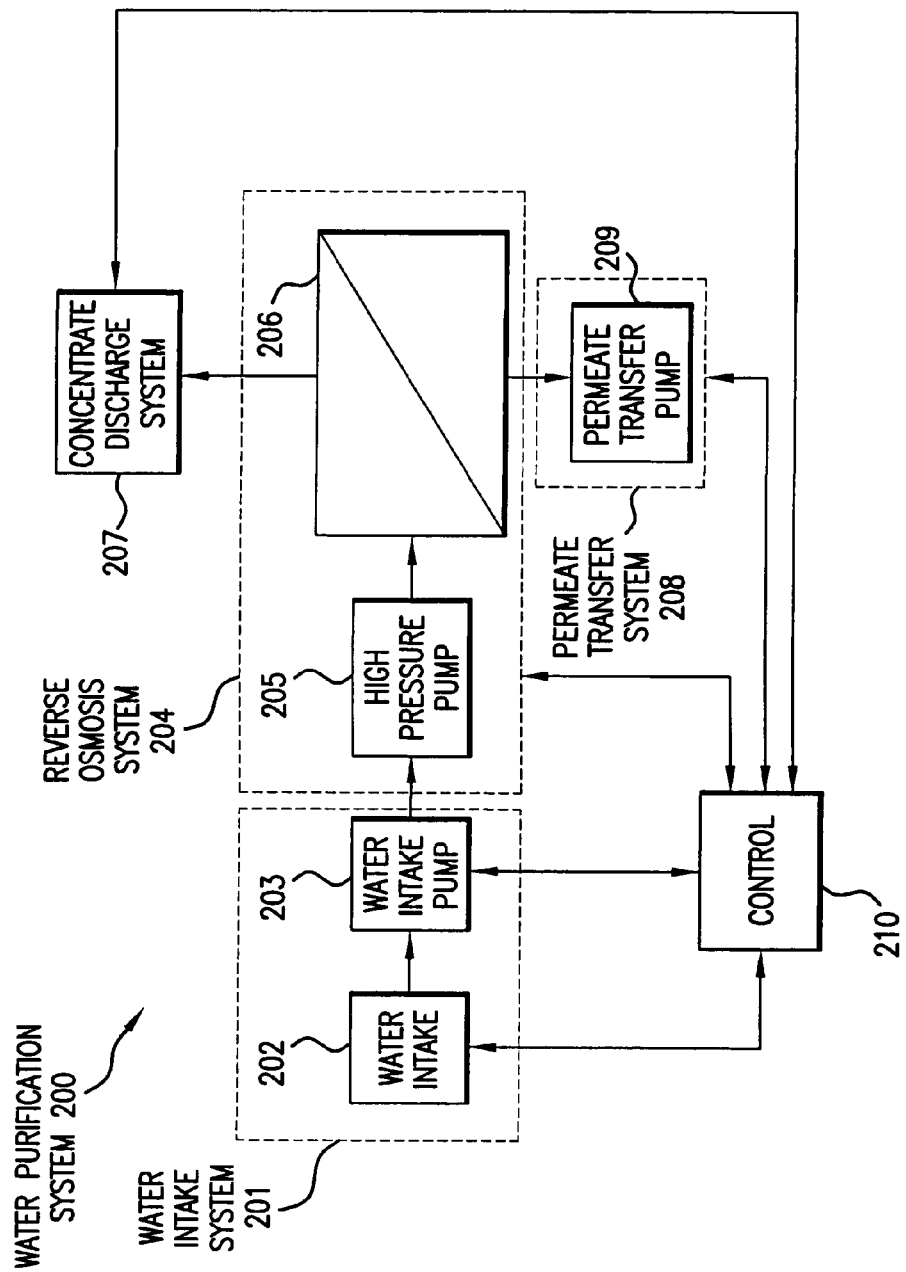
FIG. 2 is a schematic of a system according to an embodiment of the present invention.

With reference now to the drawings, and in particular, to FIGS. 1 and 2, the present invention provides a vessel 101 comprising: a water purification system 200 comprising a water intake system 201 comprising a water intake 202 and a water intake pump 203; a reverse osmosis system 204 comprising a high pressure pump 205 and a reverse osmosis membrane 206; a concentrate discharge system 207 comprising a plurality of concentrate discharge ports; a permeate transfer system 208 comprising a transfer pump 209; a power source 103; and a control system 210.

The reverse osmosis system 204 is in communication with the water intake system 201, and the concentrate discharge system 207 and the permeate transfer system 208 are in communication with the reverse osmosis system 204. The power source 103 is in communication with the water intake system 201, the reverse osmosis system 204, and the permeate transfer system 208. The control system 210 is in communication with the water intake system 201, the reverse osmosis system 204, the concentrate discharge system 207, the permeate transfer system 208, and the power source 103.

The terms "communicate" or "communication" mean to mechanically, electrically, or otherwise contact, couple, or connect by either direct, indirect, or operational means.

The water intake system 201 provides water to the high pressure pump 205 and the high pressure pump 205 pushes water through the reverse osmosis membrane 206, whereby a concentrate is created on the high pressure side of the reverse osmosis membrane 206. The concentrate is discharged into the water surrounding the vessel 101 through the plurality of concentrate discharge ports of the concentrate discharge system 207. On the low pressure side of the reverse osmosis membrane 206, the permeate created can be transferred from the vessel 101 through the permeate transfer system 208.

The vessel 101 may further comprise a propulsion device 102 in communication with the power source 103. A separate power source may provide power to each of the water intake system 201, reverse osmosis system 204, permeate transfer system 208, and propulsion device 102. For example, each of the water intake pump 203, high pressure pump 205, and permeate transfer pump 209 may be in communication with a separate power source. The vessel 101 may be either a self-propelled ship, a moored, towed, pushed or integrated barge, or a flotilla or fleet of such vessels. The vessel 101 may be manned or unmanned. The vessel 101 may be either a single hull or double-hull vessel.

In an alternate embodiment, one power source may provide power to a combination of two or more of the water intake system 201, reverse osmosis system 204, permeate transfer system 208, and propulsion device 102. For example, the electric power for the high pressure pump 205 may be provided by a generator driven by the power source for the vessel's propulsion device, such as a vessel's main engine. In such an embodiment, a step-up gear power take off or transmission would be installed between the main engine and the generator in order to obtain the required synchronous speed.

Further, an additional coupling between the propulsion device and the main engine allows the main engine to drive the generator while the vessel is not under way. Moreover, an independent power source (not shown), such as a diesel, steam or gas turbine, or combination of such, can power the reverse osmosis system 204, the propulsion device 102, or both.

In another embodiment, the power source of water purification system 200 is dedicated to the water purification system 200 and is not in communication with any propulsion device on the vessel 101.

In another embodiment, the plurality of concentrate discharge ports of the concentrate discharge system 207 may act as an auxiliary propulsion device for the vessel 101 or act as the sole propulsion device for the vessel 101. Some or all of the concentrate may be passed to propulsion thrusters to provide idling or emergency propulsion.

In another embodiment, the power source may comprise electricity producing windmills or water propellers that harness the flow of the air or water to generate power for the water purification system or the operation of the ship.

The water intake system 201 is capable of taking in water from the body of water surrounding the vessel and providing it to the reverse osmosis system 204. In an embodiment, the water intake 202 of the water intake system 201 comprises one or more apertures in the hull of the vessel below the water line. An example of a water intake 202 is a sea chest. Water is taken into the vessel through the water intake 202 comprising the one or more apertures, passed through the water intake pump 203, and supplied to the high pressure pump 205 of the reverse osmosis system 204.

The reverse osmosis system 204 comprises a high pressure pump 205 and a reverse osmosis membrane 206. Reverse osmosis membranes are of composite construction. One extensively used form comprises two films of a complex polymeric resin which together define a salt passage. In this process, pretreated raw water is pressed through a semi-permeable barrier that disproportionately favors water permeation over salt permeation. Pressurized feedwater enters a staged array of pressure vessels containing individual reverse osmosis membrane elements where it is separated into two process streams, permeate and concentrate. Separation occurs as the feed water flows from the membrane inlet to outlet. The feed water first enters evenly spaced channels and flows across the membrane surface with a portion of the feed water permeating the membrane barrier. The balance of the feedwater flows parallel to the membrane surface to exit the system unfiltered. The concentrate stream is so named because it contains the concentrated ions rejected by the membrane The concentrated stream is also used to maintain minimum crossflow velocity through the membrane element with turbulence provided by the feed-brine channel spacer. The type of reverse osmosis membrane used in the present invention is limited only by its compatibility with the water and/or contaminants in the surrounding body of water.

The high pressure pump 205, operable to push the raw water through the reverse osmosis membrane 206, comprises any pump suitable to generate the hydraulic pressure necessary to push the raw water through the reverse osmosis membrane 206.

In an embodiment, the vessel 101 may comprise a plurality of reverse osmosis systems 104, also referred to as trains. The plurality of reverse osmosis systems may be installed on the vessel's deck 105. The plurality of reverse osmosis systems 104 may also be installed in other parts of the vessel 101. The plurality of reverse osmosis systems 104 may also be installed on multiple levels. For example, each reverse osmosis system of the plurality of reverse osmosis systems 104 may be installed in a separate container. Several containers can be placed on top of each other to optimize the use of the deck 105 on the vessel 101 and to decrease the time and expense associated with construction of the water purification system on the vessel 101. The plurality of reverse osmosis systems 104 are preferably installed in parallel, but other configurations are possible.

The permeate transfer system 208 is capable of transferring the permeate produced to a permeate delivery means, such as a tug-barge unit or tanker vessel In an embodiment, the permeate transfer system 208 is capable of transferring the permeate produced to a permeate delivery means comprising a transfer vessel means while the vessel 101 and the transfer vessel means are under way. The permeate transfer system 208 is also capable of transferring the permeate produced to a permeate delivery means comprising a pipeline in communication with the permeate transfer system 208.

The control system 210 comprises any system capable of controlling the operation of the water intake system 201, the reverse osmosis system 204, the concentrate discharge system 207, the permeate transfer system 208, and the power source 103 on the vessel 101. The control system 210 is located in a suitable location according to the needs of the vessel 101. The control system 210 may further comprise any system capable of controlling the operation of the vessel 101. In an embodiment, the control system may comprise a processor to make autonomous operational decisions to run the vessel 101 and the water purification system 200. A specific control system envisioned is the TLX software available from Auspice Corp., although other systems can be included in the design such as a programmable logic control (PLC) system.

The processor generally is in communication with the control system 210. Suitable processors include, for example, digital logical processors capable of processing input, executing algorithms, and generating output. Such processors can include a microprocessor, an Application Specific Integrated Circuit (ASIC), and state machines. Such processors include, or can be in communication with media, for example computer readable media, which store instructions that, when executed by the processor, cause the processor to perform the steps described herein as carried out, or assisted, by a processor.

One embodiment of a suitable computer-readable medium includes an electronic, optical, magnetic, or other storage or transmission device capable of providing a processor, such as the processor in a web server, with computer-readable instructions. Other examples of suitable media include, but are not limited to, a floppy disk, CD-ROM, magnetic disk, memory chip, ROM, RAM, ASIC, configured processor, all optical media, magnetic tape or other magnetic media, or any other medium from which a computer processor can read. Also, various other forms of computer-readable media may transmit or carry instructions to a computer, including router, private, or public network, or other transmission device or channel.

In one embodiment, the control system 210 comprises security systems operable to control physical access to the control system 210. In another embodiment, the control system 210 comprises network security systems operable to control electronic access to the control system 210.

The concentrate discharge system 207 is configured to increase the mixing of the concentrate discharged into the surrounding body of water. The plurality of concentrate discharge ports of the concentrate discharge system 207 can be physically located above or below the water line of the vessel 101.

Figure 3:
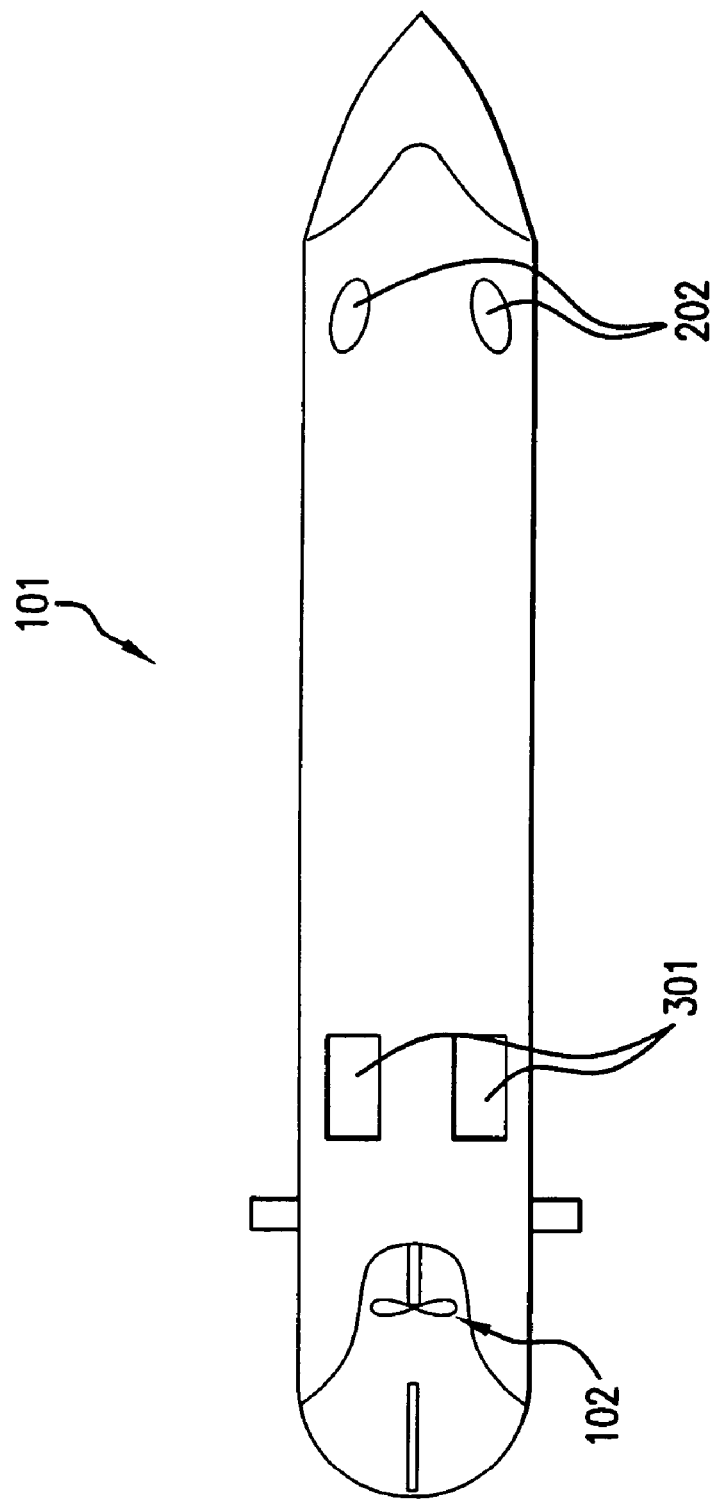
FIG. 3 is a bottom view of the vessel of FIG. 1A.

Referring now to FIG. 3, in an embodiment, a plurality of concentrate discharge ports 301 are physically located in such a way that a portion of the concentrate discharged through the plurality of concentrate discharge ports 301 is capable of being mixed with the water surrounding the vessel 101 by a propulsion device 102 for the vessel 101.

In an embodiment comprising a plurality of reverse osmosis systems, a separate concentrate discharge system is connected to each reverse osmosis system.

Figure 4:
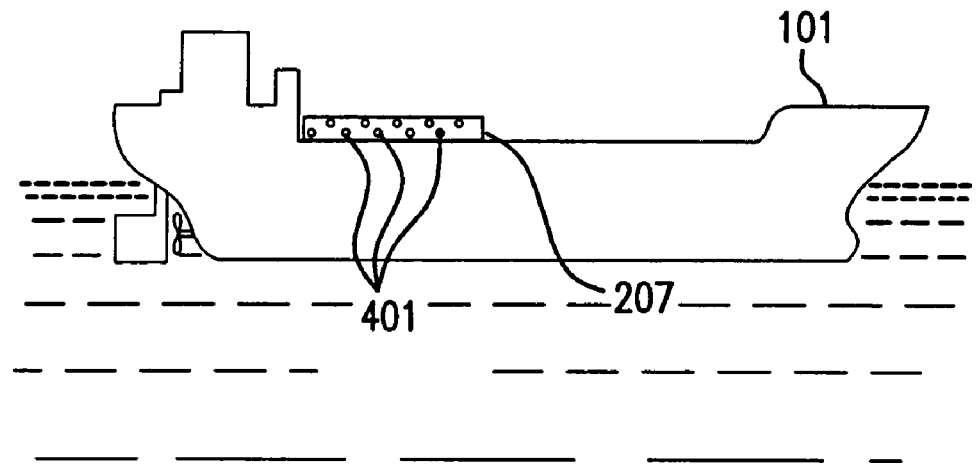
FIG. 4 is a side view of a vessel according to another embodiment of the present invention.

Referring now to FIG. 4, in another embodiment comprising a plurality of reverse osmosis systems, the concentrate discharged from each reverse osmosis system is collected by the concentrate discharge system 207 in one or more longitudinally oriented manifold pipes, structural box girders, or tunnels. At intervals along the vessel 101, a plurality of discharge ports 401, allows the concentrate to be discharged over a substantial portion of the vessel's 101 length.

Figure 5A:
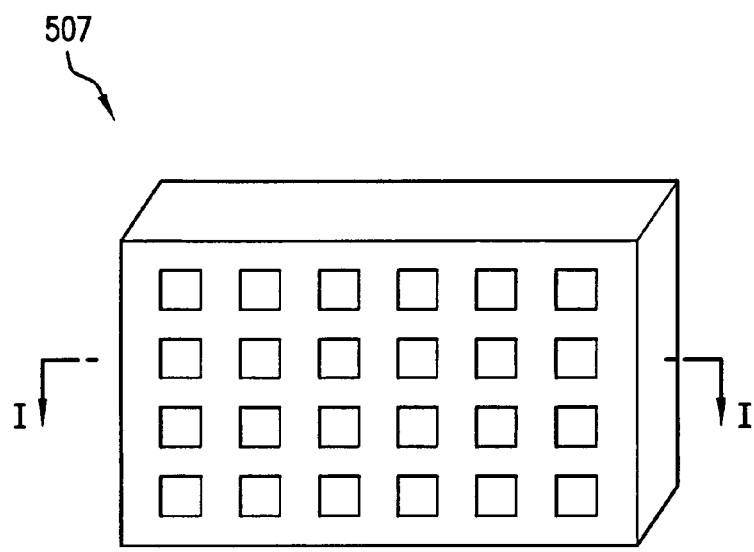
FIG. 5A is a perspective view of a dispersion device according to an embodiment of the present invention.
Figure 5B:
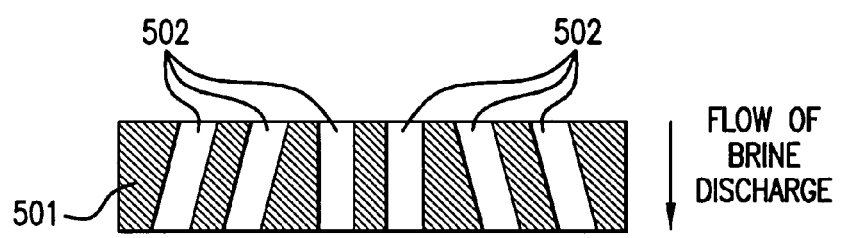
FIG. 5B is a section view of the grate of FIG. 5A taken along line I-I.

Referring now to FIG. 5, in another embodiment of the concentrate discharge system 207, each discharge port incorporates a grate 507 designed to assist mixing having divergently oriented apertures 502. A grating with protrusions into the grating's apertures may also be used to assist mixing.

In another embodiment, the concentrate discharge ports of the concentrate discharge system 207 are configured in a manner similar to the exhaust nozzles on an F-15 fighter jet such that the concentrate discharge ports may change their circumference and may also change the direction of the flow of the concentrate.

Temperatures in oceans decrease with increasing depth. The temperature range extends from 30° C. at the sea surface to −1° C. at the sea bed. Areas of the oceans that experience an annual change in surface heating have a shallow wind-mixed layer of elevated temperature in the summer. This wind-mixed layer is nearly isothermal and can range from 10 to 20 meters in depth from the surface. Below the wind-mixed layer, the water temperature can decrease rapidly with depth to form a seasonal thermocline layer having sharp vertical temperature change. During winter cooling and increased wind mixing at the ocean surface, convective overturning and mixing erase the seasonal thermocline layer and deepen the wind-mixed isothermal layer. The seasonal thermocline layer can reform with summer temperatures. At depths below the wind-mixed layer and any seasonal thermocline, a permanent thermocline separates water from temperate and subpolar regions. The permanent thermocline exists from depths of about 200 m to about 1,000 m. Below this permanent thermocline, water temperatures decrease much more slowly toward the sea floor.

Thermocline regions in the ocean can reduce mixing between water in regions above and below a thermocline. Further, water in a thermocline region also may not rapidly mix with water in regions above or below the thermocline region.

As used herein, the term "thermocline" refers to a temperature gradient in a layer of sea water, in which the temperature decrease with depth is greater than that of the overlying and underlying water.

Figure 6A:
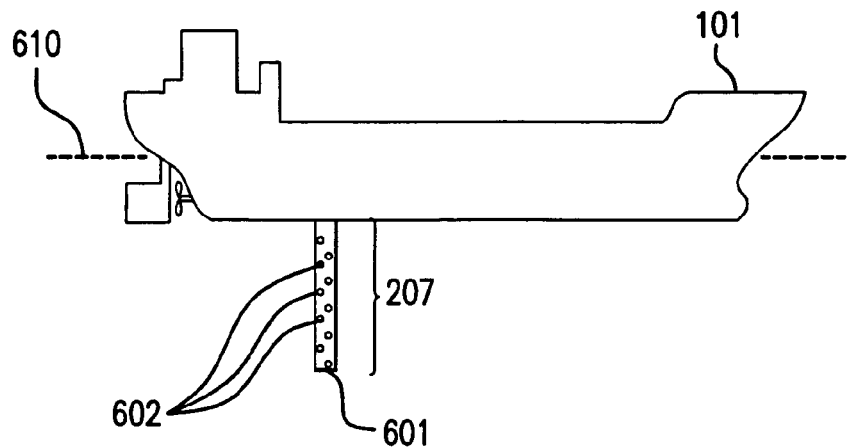
FIG. 6A is a side view of a vessel according to another embodiment of the present invention.

Referring now to FIG. 6A, in embodiments where the vessel 101 is moored, the concentrate discharge system 207 may comprise a member 601 extending down from the hull of the vessel 101 with a plurality of discharge ports 602 on the member 601. Depending on various factors such as water depth, water temperature, water currents, and the surrounding ecosystem, the member 601 may extend to the depth or depths that optimize the mixing of the concentrate with the surrounding body of water.

In an embodiment, the member 601 can be lowered from and retracted to the vessel 101 by mechanical means, such as, for example, a hydraulic assembly. Alternatively, other suitable means can be used to lower and retract the member 601, including those used in conventional maritime drilling operations. In another embodiment, the member 601 can have sufficient mass and/or density that the member 601 can be lowered from the vessel 601 to a desired depth without mechanical assistance. Such member 601 is generally retracted to the vessel 101 by mechanical means.

In a further embodiment (not pictured), the discharge member 601 incorporates an aspirator through which water from the surrounding body of water can be drawn into member 601. The flow of concentrate into member 601 creates a reduction in pressure (Venturi effect) and draws water in from the surrounding body of water for mixing with the concentrate before discharge. The resulting mixture is discharged through a plurality of discharge ports 602.

Figure 6B:
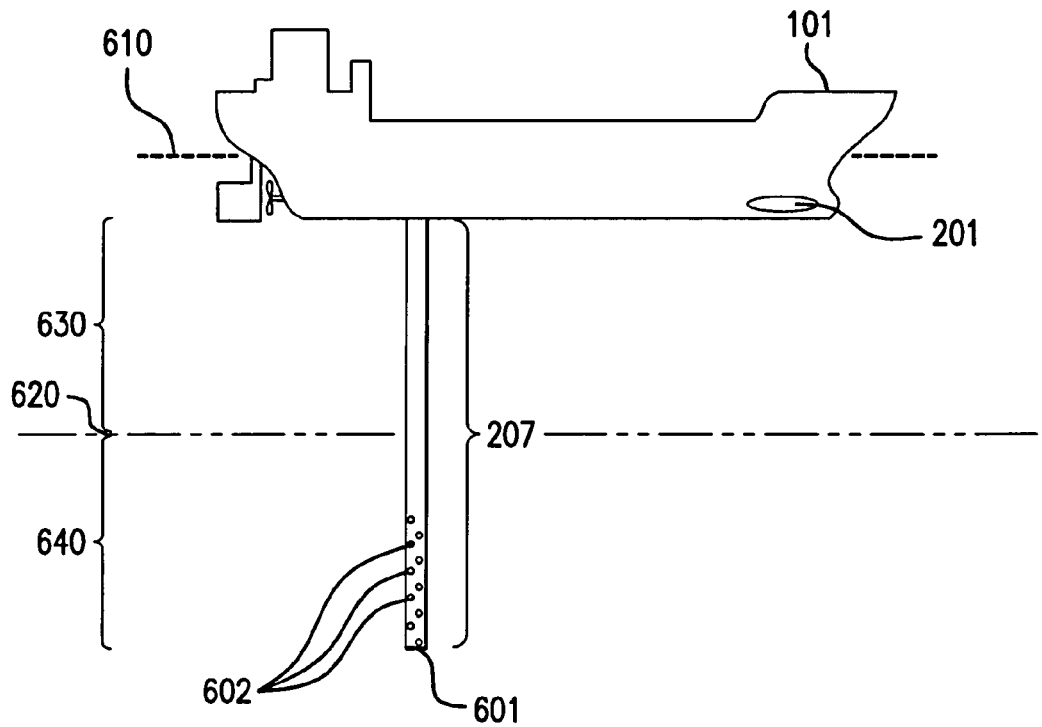
FIG. 6B is a side view of a vessel according to another embodiment of the present invention.

Referring now to FIG. 6B, wherein the water intake 202 of a water intake system 201 comprises a sea chest, discharge ports 602 are located on the member 601 such that each discharge port 602 is disposed within or below a thermocline region 640 relative to the water intake 202. Such a configuration may reduce or eliminate uptake of discharged concentrate into the water purification system 200. In embodiments where the water intake 202 comprises an aperture in the hull of the vessel and the draught of the vessel 101 is less than the depth of the wind-mixed isothermal surface layer of a surrounding body of water, the member 601 can extend into or below a seasonal thermocline region wherein the plurality of discharge ports are disposed within or below the seasonal thermocline. For example, the draught of ships having a dead weight tonnage of less than 200,000 is typically less than 20 meters and also less than the depth of the isothermal wind-mixed layer. Sea chests disposed below the water line on the forward part of the vessel 101 would be expected to draw water from the isothermal wind-mixed layer.

Figure 7:
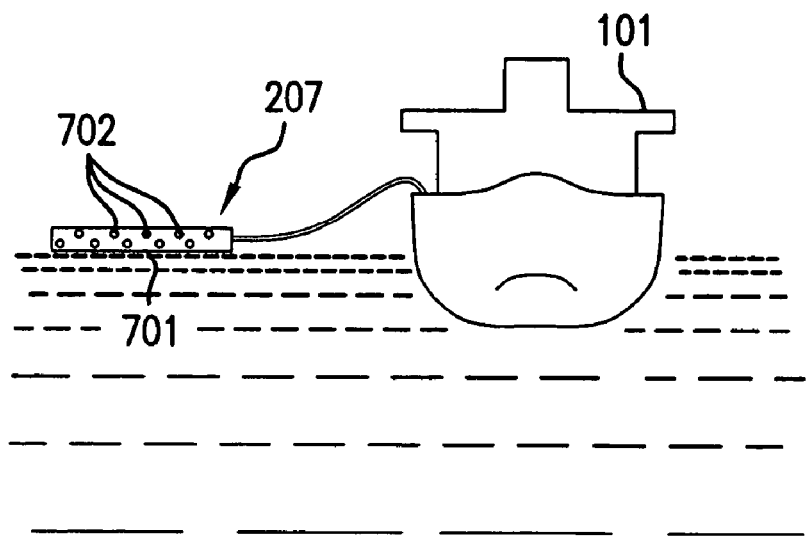
FIG. 7 is a front view of a vessel according to another embodiment of the present invention.

Referring now to FIG. 7, in another embodiment, the concentrate discharge system 207 comprises a member 701 having a plurality of concentrate discharge ports 702 wherein the member 701 floats on the water's surface through the use of support pontoons or a catenary having support pontoons, or the member 701 may be inherently buoyant.

In another embodiment, each concentrate discharge port of the concentrate discharge system 207 may be mounted on dispersion devices that enable the discharge ports to move in a full hemi-sphere range. The dispersion devices may comprise a universal joint, a swivel, a gimble, a ball and socket, or other similar devices known to one skilled in the art. Through the oscillation or motion of the plurality of concentrate discharge ports, the concentrate should be more evenly dispersed into the surrounding water.

In another embodiment, the concentrate discharge system 207 may further comprise a pump to increase the water pressure of the concentrate prior to being discharged through the plurality of concentrate discharge ports.

In another embodiment, the vessel 101 further comprises a heat recovery system in communication with the exhaust of a power source, the water intake system 201, the control system 210, and the reverse osmosis system 204. The heat recovery system can use the heat energy generated by one or more power sources to heat the water taken in by the water intake system 201 before for the water passes to a reverse osmosis membrane 206.

In another embodiment, the vessel 101 may further comprise a heat exchange system in communication with the reverse osmosis system 204 and the concentrate discharge system 207. The heat exchange system comprises a heat exchanger and a cooling system. The heat exchange system reduces the temperature of the concentrate to at or about the temperature of the water surrounding the vessel 101. Since the concentrate normally has an elevated temperature as compared to the temperature of the intake water, installing a heat exchanger system operationally between the reverse osmosis system 204 and concentrate discharge system 207 provides the advantage of reducing or eliminating any impact on the surrounding ecosystem that could result from the discharge of concentrate at an elevated temperature. In another embodiment, a heat exchange system is in communication with other systems on the vessel 101.

Figure 8:
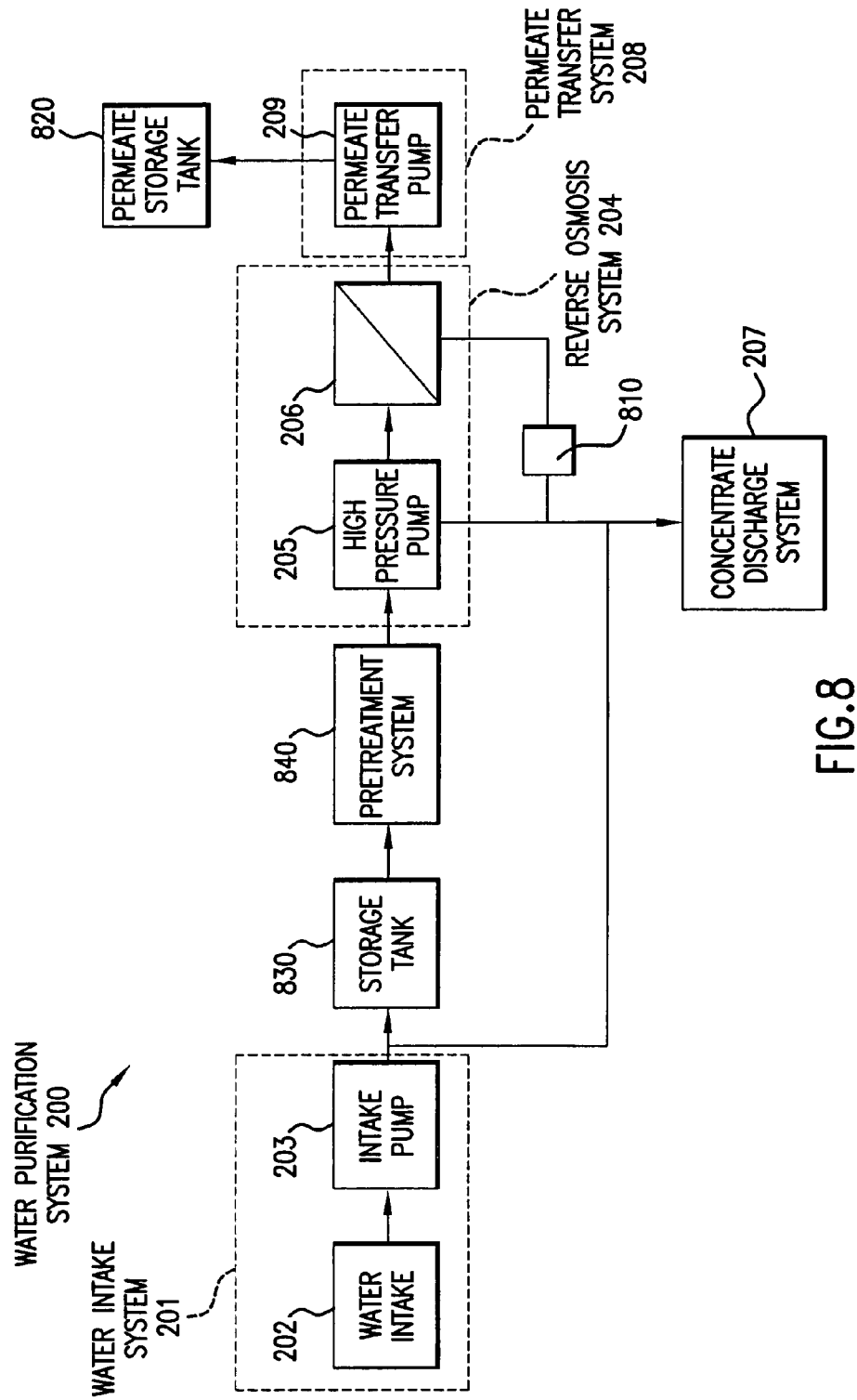
FIG. 8 is a schematic of a system according to an embodiment of the present invention.

Referring now to FIG. 8, in another embodiment, the water purification system 200 comprises, a water intake system 201 comprising a water intake 202 and a water intake pump 203, a storage tank 830, a pretreatment system 840, a reverse osmosis system 204 comprising a high pressure pump 205 and a reverse osmosis membrane 206, a concentrate discharge system 207, a permeate transfer system 208 comprising a permeate transfer pump 209, an energy recovery system 810, and a permeate storage tank 220. The energy recovery system 810 is operable to recover or convert into electricity the energy associated with the pressure of the concentrate.

The storage tank 830 is in communication with the water intake pump 203 and the pretreatment system 840. The pretreatment system 840 is in communication with the storage tank 830 and the high pressure pump 205. The energy recovery device 810 is in communication with the high pressure side of the reverse osmosis membrane 206, the high pressure pump 205, and the concentrate discharge system 207.

In an embodiment, the pretreatment system 840 comprises at least one of a debris prefilter system, a reservoir, and a surge tank. A debris filter system is typically used to insure stable, long-term reverse osmosis system performance and membrane life. The debris prefilter system may include clarification, filtration, ultrafiltration, pH adjustment, removal of free chlorine, antiscalant addition, and 5 micron cartridge filtration.

In one embodiment, the pretreatment system 840 comprises a plurality of pretreatment systems (not shown). In warm, clean waters, one pretreatment system 840 is generally sufficient. However, colder raw water temperatures (as well as more polluted waters) may require several stages of pretreatment. While the vessel 101 can be custom-built for a predetermined locale, and thus with a single pretreatment system 840, providing the vessel 101 with a plurality of pretreatment systems can permit the vessel 101 to operate in a wide variety of environments across the globe. Such an embodiment for the vessel 101 may enhance the flexibility of governmental or United Nations crisis or disaster-response planning in which disaster locations and environmental conditions cannot be readily anticipated or adequately planned for.

The energy recovery system 810 is operable to recover or convert the energy associated with the pressure of the concentrate. Examples of a energy recovery system 810 include devices such as a turbine. The energy recovered can be used to remove a stage of the high pressure pump 205, to assist in interstage boosting in a two stage water purification system, or to generate electricity.

In another embodiment, the vessel 101 further comprises one or more noise and/or vibration reduction devices in communication with any moving mechanical device aboard the vessel 101 and the hull of the vessel 101. Such mechanical devices include, but are not limited to, a power source, a high pressure pump, a transfer pump, and a water intake pump. The noise reduction devices may comprise any isolation, suspension, or shock absorbers known to one skilled in the art. The noise reduction devices also include any noise abatement technique known to one skilled in the art. Noise reduction devices may include a hull comprising composite material or machines with precision manufacturing such that the rattle associated with a mechanical device is reduced when operating.

In another embodiment, the vessel 101 further comprises noise and/or vibration reduction devices to dampen vibrations associated with the movement of fluids through piping in the vessel such as encasement on a pipe's exterior. The encasement of a pipe can reduce velocity noise in piping generated by the movement of water. Noise reduction devices can reduce the vibrations or noise transmitted through the hull of the vessel 101 and thereby reduce any disturbance or interference with normal aquatic or marine life. For example, the noise reduction devices can reduce interference with the acoustic communication between whales. Further, the noise reduction devices can reduce the hearing hazard to the crew of the ship.

Referring now to FIGS. 9 through 12 in general, in another embodiment, the vessel 101 further comprises a mixing system in communication with the reverse osmosis system 204 and the concentrate discharge system 207. The mixing system is capable of mixing the concentrate with water taken directly from the surrounding body of water before discharging the concentrate. Such a system is operable to dilute and/or cool the concentrate before returning it to the surrounding body of water.

Figure 9:
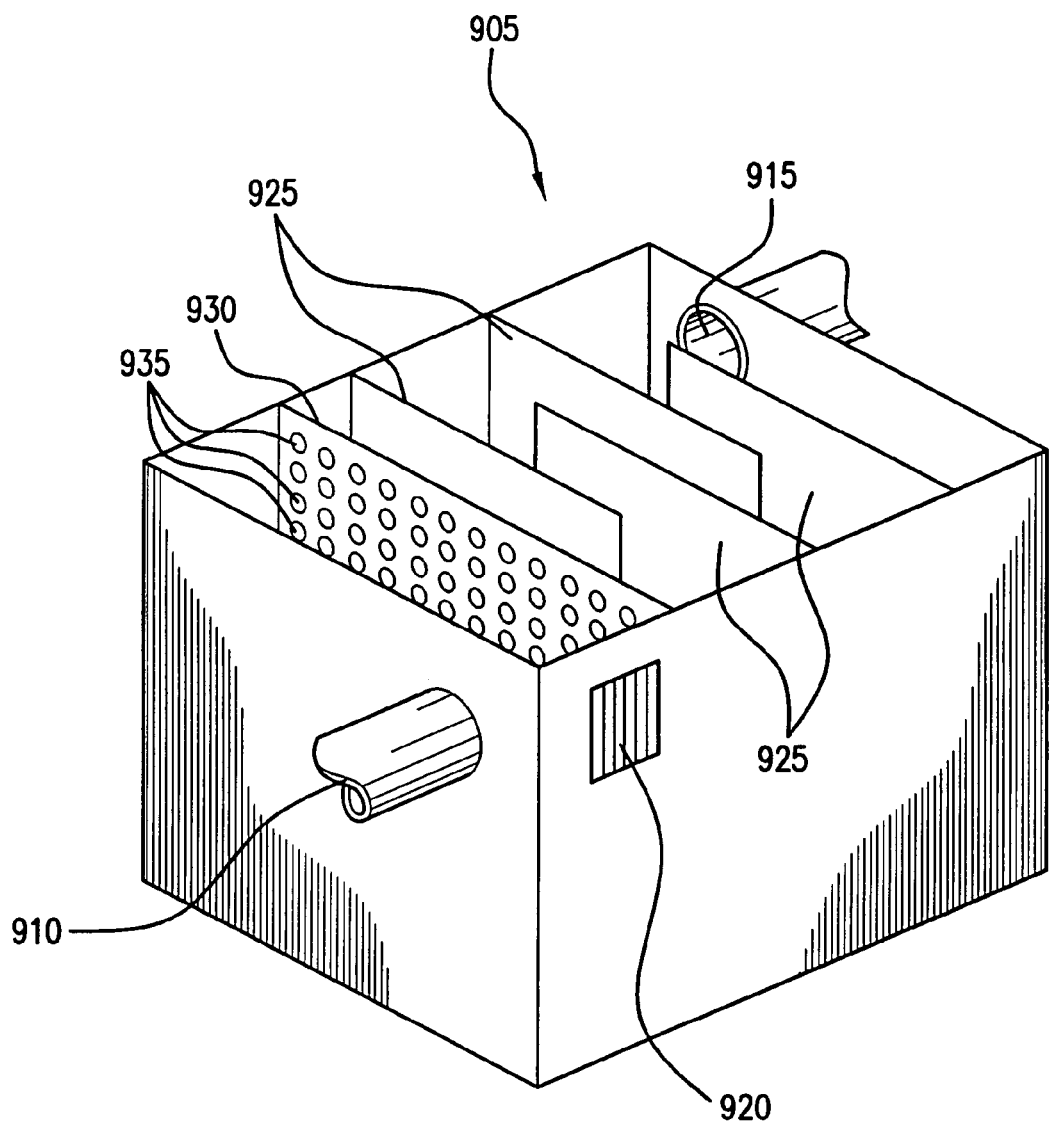
FIG. 9 is a perspective view of a mixing tank according to an embodiment of the present invention.

Referring now to FIG. 9, in an embodiment, a mixing system comprises a mixing tank 905 comprising a concentrate inlet 910, a concentrate outlet 915, a mixing water intake system 920 comprising a water intake and a pump, a series of baffles 925, and a mixing barrier 935 comprising a plurality of apertures 935, wherein water taken in through the mixing water intake system 920 (i.e. native water) and the concentrate are forced through the mixing barrier and mixed before flowing to the concentrate discharge system 207. The size, shape, location and number of apertures 935 are selected to optimize mixing of the concentrate with the native water. The apertures 935 should induce turbulence in fluids flowing through the mixing barrier 930. The mixing barrier 930 extends from one side of the mixture tank 905 to the opposing side of the mixing tank 905. Adjacent baffles are coupled to opposing sides of the mixing tank 905. The baffles are arranged in a staggered relationship such that a portion of each baffle 925 overlaps with an adjacent baffle 925. The fluid passing though the mixing barrier 930 must follow a convoluted route before reaching the concentrate discharge system 207.

In another embodiment (not pictured), the mixing system comprises a mixing tank comprising a concentrate inlet, a concentrate outlet, a mixing water intake system comprising a water intake and a pump, and any device capable of forming a substantially homogeneous mixture from the concentrate and native water. Example of such devices include high speed paddle mixers and a static mixer.

By mixing the concentrate with native water, the water purification system 200 is capable of returning a diluted concentrate back into the surrounding body of water. For example, if the surrounding body of water contained total dissolved solids (TDS) of 30,000 mg/L and the water purification system were operating at a recovery of 50% permeate, then the TDS of the concentrate would be about 60,000 mg/L. By mixing native water with the concentrate, the TDS of the diluted concentrate would be between 60,000 and 30,000 TDS.

In another embodiment, the water intake of the mixing tank is operable to provide diluting water to the mixing tank having a TDS below the TDS of the water surrounding the vessel. Examples of sources such diluting water include, but are not limited to, permeate from the reverse osmosis system and rain water collected on the vessel or another vessel.

In another embodiment, the water intake of the mixing system is the same water intake as the water intake 202 of the water intake system 201. In another embodiment, the water intake of the mixing system is a separate water intake. The baffles may be oriented horizontally, transversely, or longitudinally.

Figure 10:
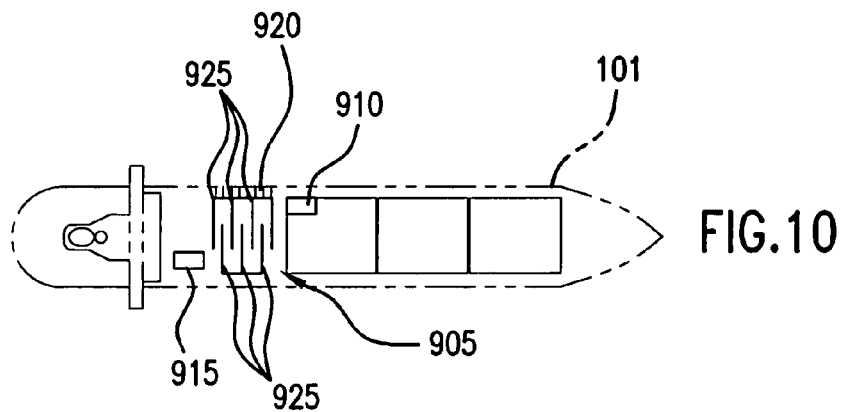
FIG. 10 is a top view of a vessel according to another embodiment of the present invention.
Figure 11:
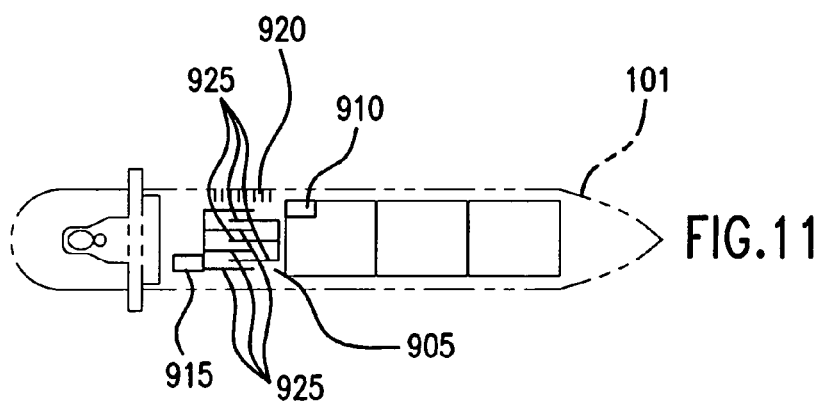
FIG. 11 is a top view of a vessel according to another embodiment of the present invention.
Figure 12:
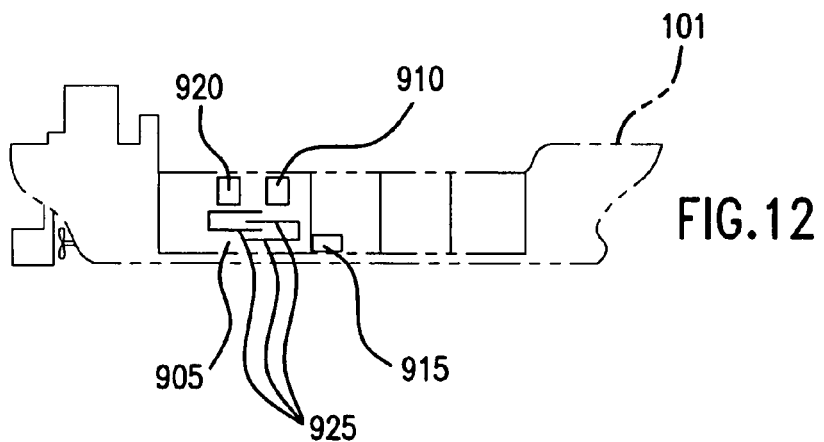
FIG. 12 is a side view of a vessel according to another embodiment of the present invention.

Referring now to FIGS. 10, 11, and 12, in an embodiment, the mixing tank 905 of the mixing system comprises a hold 109 in the vessel 101. As shown in FIG. 10, in an embodiment, the baffles 925 are oriented transversely. As shown in FIG. 11, in an embodiment, the baffles 925 are oriented longitudinally. As shown in FIG. 12, in an embodiment, the baffles 925 are oriented horizontally.

Referring again to FIG. 1A, in another embodiment, the vessel 101 further comprises a permeate storage tank comprising holds 109 for the permeate wherein the permeate storage tank is in communication with the reverse osmosis system 204 and the permeate transfer system 208. In another embodiment, the vessel 101 further comprises a packaging system 110 in communication with the permeate storage tank. The packaging system 110 includes extraction pumps with supply lines for drawing permeate out of the permeate storage tank. The packaging system 110 may be used in emergency situations where an infrastructure to distribute the permeate is not in place or has been damaged.

In another embodiment, the water purification system 200 of the vessel 101 further comprises a permeate treatment system in communication with the low pressure side of the reverse osmosis membrane 206 and the permeate transfer system 209. In one embodiment, the permeate treatment system comprises corrosion control system. In another embodiment, the permeate treatment system comprises a permeate disinfection system. In another embodiment, the permeate treatment system comprises a permeate conditioning system to adjust to taste characteristics of the permeate. In another embodiment, the permeate treatment system comprises a corrosion control system, a permeate disinfection system and a permeate conditioning system. In another embodiment, the permeate treatment system is operationally located after the permeate transfer system 208. For example, see the description of one embodiment of the land-based distribution system 1330 below.

In another embodiment, the vessel 101 comprises a plurality of reverse osmosis systems 104 wherein the vessel 101 is capable of producing 5,000 to 450,000 cubic meters of permeate per day (approximately 1 to 100 million gallons of permeate per day). In other embodiments, the amount of water the vessel 101 is capable of producing will depend on the application and the size of the vessel 101 used.

In another embodiment, the vessel 101 has a dead weight tonnage (dwt) of between about 10,000 to 500,000. In another embodiment, the vessel 101 has a dwt of between about 30,000 and 50,000. In another embodiment, the vessel 101 has a dwt of between about 65,000 and 80,000. In another embodiment, the vessel 101 has a dwt of about 120,000. In another embodiment, the vessel 101 has a dwt of between about 250,000 and 300,000. In another embodiment, the dwt of the vessel 101 depends on the intended application, the minimum draft to keep the vessel 101 afloat, and/or the desired production capacity of the vessel 101.

Instead of purifying water using reverse osmosis methods, the vessel 101 may be equipped with other water desalination or purification technologies. For example, the vessel may be equipped with multi-stage flash evaporation, multi-effective distillation, or mechanical vapor compression distillation.

Figure 27:
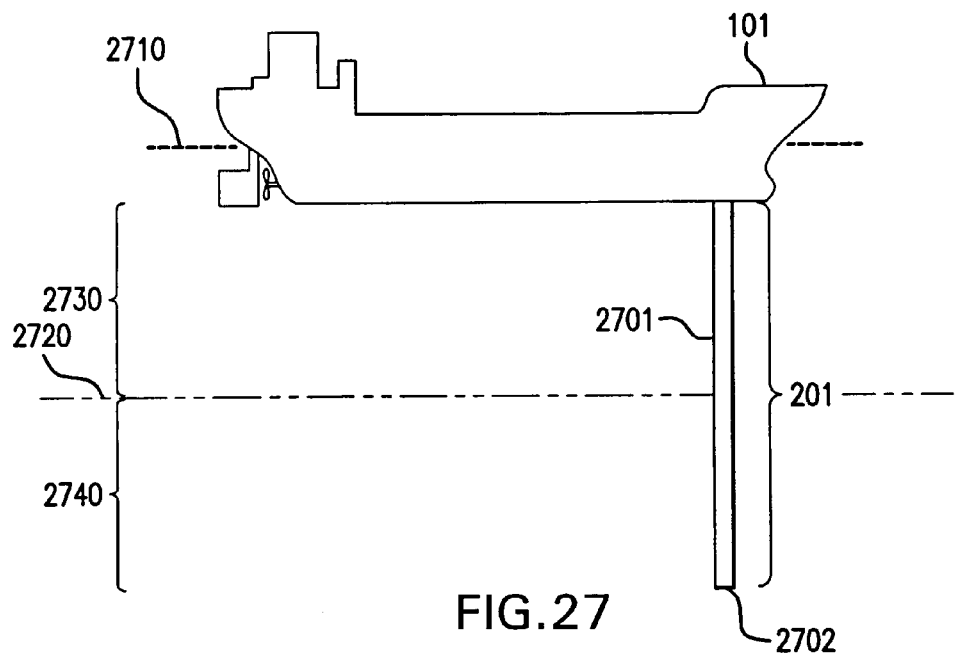
FIG. 27 is a side view of a vessel according to another embodiment of the present invention.

Referring now to FIG. 27, in embodiments where the vessel 101 is moored, the water intake system 201 comprises a water intake member 2701 extending from the hull of the vessel 101. The member 2701 has a water intake 2702 at the distal end of the water intake member 2701. In separate embodiments (not pictured), the water intake member 2701 may have a plurality of water intakes 2702, and the water intake(s) 2702 may be located in positions other than the distal end of the water intake member 2701. In another embodiment, the water intake member 2701 extends into or below a thermocline region 2740 and the concentrate discharge ports are disposed above the thermocline region 2740.

Figure 28:
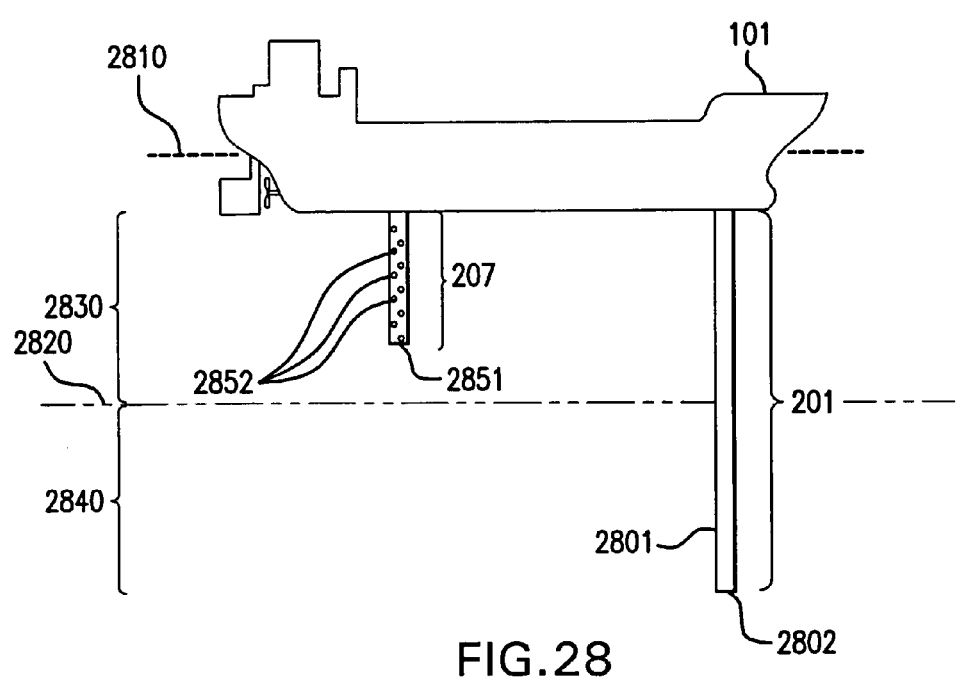
FIG. 28 is a side view of a vessel according to another embodiment of the present invention.

Referring now to FIG. 28, in embodiments where the vessel 101 is moored, the water intake system 201 comprises a water intake member 2801 extending from the hull of the vessel 101. The water intake member 2801 has a water intake 2802 at the distal end of the water intake member 2801. In separate embodiments (not pictured), the water intake member 2801 may have a plurality of water intakes 2802, and the water intakes 2802 may be located in positions other than the distal end of the water intake member 2801. The vessel 101 in FIG. 28 further comprises a concentrate discharge member 2851 extending down from the hull of the vessel 101 with a plurality of discharge ports 2852 on the member 2851. The water intake member 2801 extends into or below thermocline region 2840 such that each water intake 2802 is disposed within or below the thermocline region 2840. Further, the discharge ports 2852 are located above the thermocline region 2840. In another embodiment (not pictured), the location of the water intake 2802 and the concentrate discharge ports 2852 may be reversed such that the water intake 2802 is located above the thermocline region 2840 in which the plurality of concentrate discharge ports 2852 is located.

Plankton is the productive base of both marine and fresh water ecosystems. The plant-like community of plankton is known as phytoplankton and the animal like community is known as zooplankton. Most phytoplankton serve as food for zooplankton. Phytoplankton production is usually greatest from 5 to 10 meters below the surface of the ocean. Since little if any sunlight penetrates to debts below 20 meters, most phytoplankton exist above 20 meters.

Since phytoplankton is the foundation for a large part of the ecosystem and the ocean, one embodiment of the present invention is operable to reduce any disruption of an ecosystem resulting from the intake of plankton into the water purification system. Specifically, the system is operable to intake water into the water intake system at various depths to reduce intake of plankton. In one embodiment, the water intake system is operable to intake water at a depth below 10 meters.

The draught of ships having a dwt of over 100,000 is usually at least 10 meters. Sea chests located on the lower most regions of the hull on ships having draught of more than 10 meters can intake water below 10 meters and potentially reduce any intake of plankton into the water purification system.

In another embodiment, the water intake system is operable to intake water below depths of over 10 meters. Water intake members as shown in FIG. 27 (2701) and FIG. 28 (2801) are operable to intake water at depths below 10 meters and reduce any intake of plankton into the water purification system.

In another embodiment, the vessel and water purification system are operable to allow an operator to choose between using a sea chest or a water intake member to intake water into the water purification system. An operator may choose to use a sea chest or a water intake member to intake water based upon the location and depth of thermoclines in water surrounding the vessel and based on the amount of plankton at any particular depth. In a further embodiment, the vessel is equipped with instrumentation and sensors to allow an operator to detect the presence of and depth of thermoclines and/or plankton populations in the surrounding body of water. In addition, if large amounts of plankton are detected, instrumentation and sensors can assist an operator to navigate and operate in regions in the surrounding body of water containing fewer plankton or containing thermoclines that optimize any reduction in the mixing of discharge concentrate in water taken into the water purification system.

Figure 23:
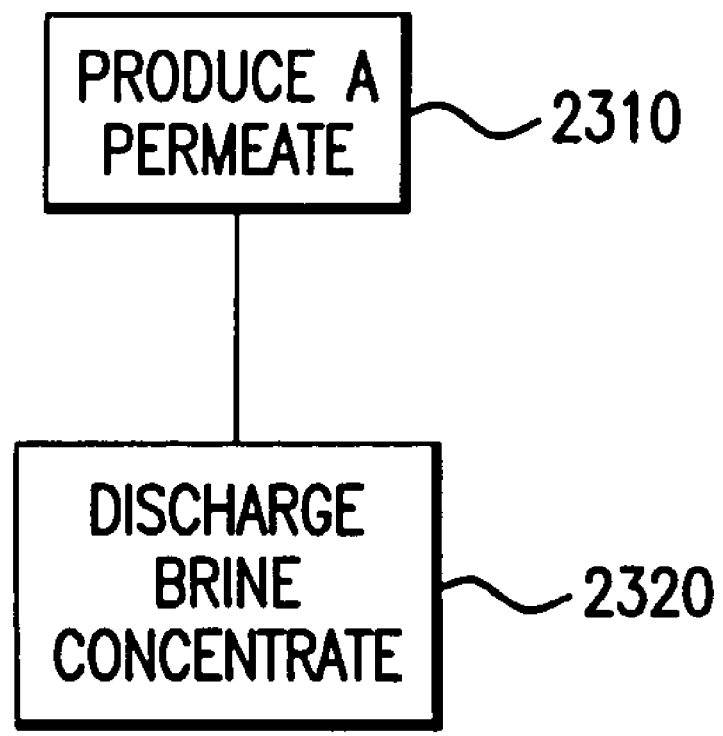
FIG. 23 is a method according to another embodiment of the present invention.

Referring now to FIG. 23, in another aspect, the present invention provides a method 2301 for producing a permeate on a floating structure comprising: producing permeate wherein a concentrate is produced 2310; and discharging the concentrate into the surrounding water through a concentrate discharge system comprising a plurality of concentrate discharge ports 2320.

In an embodiment of the method 2301, the step of producing a permeate comprises pumping water through a reverse osmosis system comprising a high pressure pump and a filter element comprising a reverse osmosis membrane wherein a concentrate is produced on the high pressure side of the reverse osmosis membrane.

In another embodiment, the method 2301 further comprises the step of having the floating structure travel through the water while discharging the concentrate.

In another embodiment, the method 2301 comprises pumping water to be purified through a plurality of reverse osmosis systems in a parallel configuration.

In another embodiment, the method 2301 further comprises the step of having the floating structure travel through the water in a pattern selected from the group consisting of a substantially circular pattern, an oscillating pattern, a straight line, and any other pattern determined by testing to be most advantageous to dispersing the concentrate into the surrounding water and water currents.

In another embodiment, the method 2301 further comprises the step of having the floating structure remain substantially fixed relative to a position on land and having the concentrate dispersed by water current.

In another embodiment of the method 2301, the plurality of concentrate discharge ports are located on the vessel such that a substantial portion of the discharged concentrate is mixed with the surrounding water by a propulsion device of the floating structure. In another embodiment of the method 2301, the plurality concentrate discharge of ports may be located above or below the water line of the floating structure. In another embodiment of the method 2301, the plurality of concentrate discharge ports are located such that the discharged concentrate is capable of propelling the vessel in an auxiliary fashion or as the sole propulsion device.

In another embodiment of the method 2301, the method may further comprise the step of mixing the concentrate with water taken directly from the surrounding body of water before discharging the concentrate.

In an embodiment, the step of mixing the concentrate with water taken directly from the surrounding body of water comprises passing the concentrate and the water taken directly from the surrounding body of water together through a series of baffles before being discharged through the plurality of concentrate discharge ports. The baffles may be oriented horizontally, transversely, or longitudinally. Adjacent baffles are coupled to opposing sides of the mixing tank. The baffles are arranged in a staggered relation such that a portion of each baffle overlaps with an adjacent baffle. The water taken in and the concentrate follows a convoluted route before reaching the concentrate discharge system.

In another embodiment of the method 2301, the concentrate is mixed with water from the surrounding body of water within the concentrate discharge member. The water from the surrounding body of water is drawn into the discharge member through an aspirator which generates a suction as the concentrate flows into the discharge member. The concentrate is subsequently mixed with the incoming water before the mixture is discharged. The concentrate is discharged in a manner to increase the mixing of the concentrate with the surrounding body of water.

In another embodiment of the method 2301, the plurality of concentrate discharge ports are physically located in such a way that a portion of the concentrate discharged through the plurality of concentrate discharge ports is capable of being mixed with the water surrounding the vessel by the propulsion device.

In an embodiment of the method 2301 comprising a plurality of reverse osmosis systems, a separate concentrate discharge system is connected to each reverse osmosis system.

In an embodiment of the method 2301 comprising a plurality of reverse osmosis systems, the concentrate discharged from each reverse osmosis system is collected into one or more longitudinally oriented manifold pipes, structural box girders, or tunnels. At intervals along the floating structure, the plurality of discharge ports, allows the concentrate to be discharged over a substantial portion of the floating structure's length.

In another embodiment of the method 2301, each concentrate discharge port incorporates a grate designed to assist mixing with the surrounding body of water having divergently oriented apertures. A grating with protrusions into the grating's apertures may also be used to assist mixing.

In another embodiment of the method 2301, the concentrate discharge ports are configured in a manner similar to the exhaust nozzles on an F-15 fighter jet such that the concentrate discharge ports may change their circumference and may also change the direction of the flow the concentrate.

In an embodiment of the method 2301 where the floating structure is moored or otherwise stationary, the concentrate discharge may be discharged through a member extending down from the hull of the vessel or over the side of the vessel with a plurality of discharge ports on the member. Depending on various factors such as water depth, water temperature, water currents, and the surrounding ecosystem, the member may extend to the depth or depths that optimize the mixing of the concentrate with the surrounding body of water. In another embodiment, the member having a plurality of concentrate discharge ports may float on the water's surface through the use of support pontoons or a catenary having support pontoons, or through the inherent buoyancy of the member.

In another embodiment of the method 2301, each concentrate discharge port may be mounted on dispersion devices that enable the discharge ports to move in a full hemi-sphere range. The dispersion devices may comprise a universal joint, a swivel, a gimble, a ball and socket, or other similar devices known to one skilled in the art. Through the oscillation or motion of the plurality of concentrate discharge ports, the concentrate should be more evenly dispersed into the surrounding water.

In another embodiment of the method 2301, the concentrate may be further pressurized before being discharged through the plurality of concentrate discharge ports.

Figure 13:
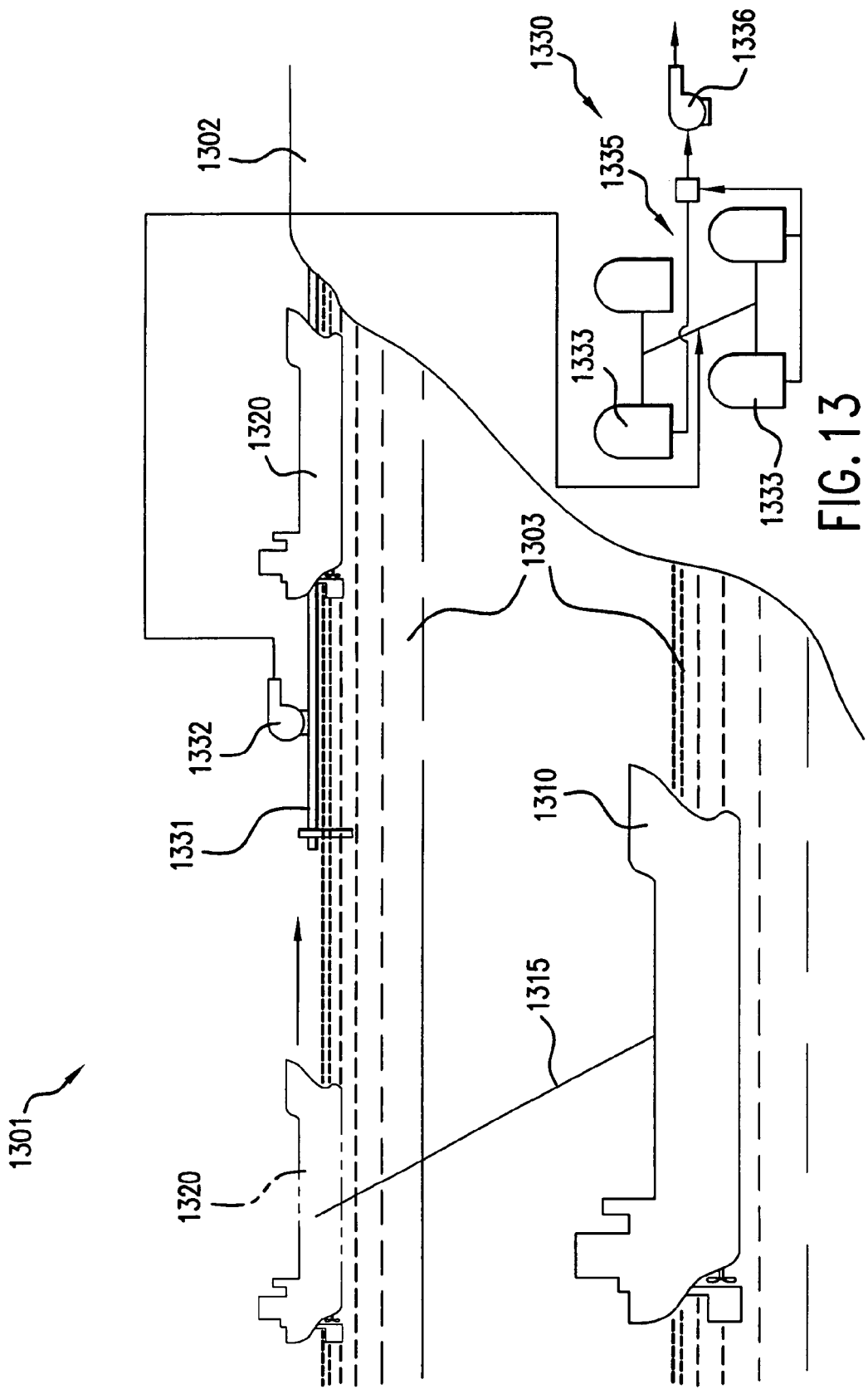
FIG. 13 is a schematic of a system according to an embodiment of the present invention.

FIG. 13 is a schematic view of an embodiment of the present invention. The system 1301 shown in FIG. 13 generally comprises a first vessel 1310 and a means for delivering a permeate from the first vessel 1310 to a land-based distribution system 1330. The terms "land-based," "on land," "shore-based," and "on shore" refer to systems and structures that are primarily or entirely disposed on land or shore. Portions or components of such systems may be disposed off-shore, on water, or on structures disposed off-shore, on the water, or moored or anchored to the sea-bed.

The first vessel 1310 includes a means for producing a permeate. In one embodiment, the permeate producing means includes a water purification system (as described in more detail herein). Other structures may be used. Other means for producing a permeate may be used in other embodiments.

Generally, the first vessel 1310 includes a converted single-hull tanker. The term "converted" generally refers to a vessel that has been reconfigured to perform a function for which the vessel was not originally designed. Here, the vessel 1310 was originally designed to transport oil. Alternatively, the first vessel 1310 can be a custom-made or custom-built vessel.

The first vessel 1310 is located off-shore and includes means for producing a permeate from the surrounding sea water. Typically, the permeate includes desalinated water. As will be described in more detail below, the first vessel 1310 also includes means for mixing a concentrate with sea water. Although the term "sea water" is used, it is to be understood that sea water can include "fresh" water, such as for example, lake water, or any other suitable source of raw water. For example, raw water can even include water delivered from ashore to the first vessel 1310 for desalination or further processing. Previously processed, or partially processed water may thus be refreshed.

In the case where the permeate is desalinated water, the concentrate generally includes a brine. Other impurities are likely to be present in the concentrate. The other impurities and total dissolved solids are dependent upon the source of the raw water. It is well known that some bodies of water are more polluted than others and that stagnant water and waters closer to shore generally contain greater amounts of pollutants and total dissolved solids than does the open sea.

The first vessel 1310 typically includes a dead-weight tonnage (dwt) in a range between approximately 10,000 tons and approximately 500,000 tons. In various embodiments, the first vessel 1310 may have a dead weight tonnage of about 40,000, 80,000, or 120,000. In another embodiment, the first vessel 1310 has a dwt of between about 30,000 and 50,000. In another embodiment, the first vessel 1310 has a dwt of between about 65,000 and 80,000. In another embodiment, the vessel 1310 has a dwt of about 120,000. In another embodiment, the first vessel 1310 has a dwt between about 250,000 and 300,000. In other embodiments, the size of the first vessel 1310 will depend on the intended application, the controlling draft, and the desired production capacity of the first vessel 1310.

A capacity of the permeate producing means is generally dependent upon the dead-weight tonnage of the first vessel 1310. However, the capacity of the permeate producing means is not limited by an internal volume formed by the hull of the first vessel 1310, as would be the oil storage capacity of such a vessel.

In one embodiment, a portion of the permeate producing means is disposed above a main deck of the first vessel 1310. For example, components of the permeate producing means can be compartmentalized in containers (see FIGS. 1A and 1B) and interconnected to one another and coupled to the main deck. Containerships are known to have containers stacked one atop each other several tiers high along a substantial length of the vessel's main deck.

In another embodiment (not pictured) where the propulsion device 102 comprises an electric motor and a propeller in communication with a power source 103, the permeate producing means is disposed below the main deck of the first vessel 1310. In a further embodiment, the power source 103 is also in communication with the permeate producing means. Advantages associated with using an electric motor and propeller to propel the first vessel 1310 include, but are not limited to, optimization of the use of space below the main deck of the first vessel 1310 and reduction in noise created by the first vessel 1310. Advantages associated with disposing the permeate producing means below the main deck of the first vessel 1310 relative to a first vessel 1310 having the permeate producing means disposed on or above the main deck include, but are not limited to, simplification of the hydraulic system for moving fluids, reduction of the number of water pumps, reduction of operating costs, reduction in the dead weight tonnage of the first vessel 1310, and reduction in size of the first vessel necessary to produce the same or similar amount of water.

Components of the permeate producing means can be arranged in a similar manner to increase the capacity of the permeate producing means otherwise limited by the internal structure of the first vessel 1310. It can be appreciated that such a configured vessel can be modified to adjust the permeate producing capacity of the first vessel 1310 as desired. Thus, the capacity of the permeate producing means generally is in a range between approximately 1 million gallons per day and approximately 100 million gallons per day. Other means for producing permeate may be used in other embodiments. Alternatively, other suitable structures can be used.

As further described above, the permeate producing means typically includes a reverse osmosis system. Alternatively, other suitable permeate producing means can be used. In one embodiment, the permeate producing means is operable to produce permeate substantially continuously. Generally, while the first vessel 1310 is in motion with respect to shore 1302, the first vessel 1310 can intake seawater 1303 to process through the permeate producing means. Alternatively, through the use of intake pumps and other known means, the first vessel 1310 can intake seawater 1303 while not in motion with respect to shore 1302.

To be in motion with respect to shore 1302, the first vessel 1310 can be underway. The term "underway" means that the first vessel 1310 is making its way over the bottom under its own power or under the power of another vessel. However, the first vessel 1310 can be in motion with respect to shore 1302 even though it is not underway. The first vessel 1310 can be in motion with respect to shore 1302 while moored, anchored, or drifting.

As discussed above, the first vessel 1310 includes a means for mixing the concentrate. As described above in greater detail, the mixing means is operable to dilute the concentrate. Also as described above in greater detail, the mixing means is operable to regulate a temperature of the concentrate to a temperature substantially equal to that of the water proximate to the first vessel 1310.

In an embodiment, the concentrate discharged by the first vessel 1310 to the surrounding body of water has substantially the same temperature as the water surrounding the first vessel 1310. In another embodiment, the diluted concentrate discharged by the first vessel 1310 to the surrounding body of water has a level of total dissolved solids between the level of total dissolved solids of the concentrate produced by the permeate producing means and the total dissolved solids of the surrounding body of water. As used herein, the term "substantially equal" does not refer to a comparison of quantitative measurements, but rather that the impact on the affected marine life or ecosystem is qualitatively negligible. Thus, in an embodiment little or no readily observable adverse environmental effects occur when discharging the concentrate directly to the waters surrounding the first vessel 1310. Other suitable structures and mixing means may be used.

In one embodiment, the permeate delivering means comprises a second vessel 1320. A dead-weight tonnage of the second vessel 1320 is in a range between about 10,000 and 500,000 tons. In one embodiment, the second vessel 1320 includes a tug-barge unit. In another embodiment, the second vessel 1320 includes a converted single or double hull tanker.

Generally, the first vessel 1310 is operable to transfer the permeate to the second vessel 1320 and the second vessel 1320 is operable to receive the permeate from the first vessel 1310. As will be described in more detail below, the second vessel 1320 is operable to deliver the permeate to the land-based distribution system 1330. Transferring fluid, typically fuel oil, between sea-going vessels is known. The transfer of permeate, i.e., desalinated water, between the first and second vessels 1310, 1320 utilizes similar principles. However, in stark contrast to transferring fuel oil between vessels, the environmental consequences of a damaged, severed, or disconnected transfer line 1315 transferring desalinated water are negligible.

In one embodiment, a transfer line 1315 communicates the desalinated water between the first and second vessels 1310, 1320. The transfer line 1315 can communicate a permeate storage compartment internal to the first vessel 1310 with a permeate storage compartment internal to the second vessel 1320. Support vessels (not shown) can be used as needed to facilitate the transfer of desalinated water between the first and second vessels 1310, 1320.

Generally, the transfer of permeate between the first and second vessels 1310, 1320 can be performed while both first and second vessels 1310, 1320 are in motion with respect to shore 1302. Alternatively, the transfer of permeate between the first and second vessels 1310, 1320 can be performed while both first and second vessels 1310, 1320 are moored or anchored. The first vessel 1310 is operable to continue producing permeate while the first and second vessels 1310, 1320 are transferring permeate.

When the transfer of permeate between the first and second vessels 1310, 1320 is complete, the second vessel 1320 can transfer the permeate to the land-based distribution system 1330 located on shore 1302 or can transfer the permeate to a third vessel (not pictured) wherein the third vessel is permanently located at the pier 1331 or wharf (not shown), quay (not shown) or dolphins (not shown). In an embodiment, the second vessel 1320 travels to and is secured to a pier 1331. The permeate is transferred to a piping system 1332 from the second vessel 1320 or a third vessel disposed proximate the pier 1331. The piping system 1332 is in communication with and transfers the permeate to the land-based distribution system 1330.

The land-based distribution system 1330 generally includes at least one water storage tank 1333, a pumping station 1336, and a pipeline or a pipeline network 1335. In one embodiment, the land-based distribution system can include a plurality of tanks 1333 located in a single tank-farm or be distributed over several locations on shore 1302. The pipeline network 1335 can interconnect the plurality of tanks 1333. Additionally, the pipeline network 1335 can communicate the water supply with individual pumping stations (not shown) and/or end-users (not shown), such as industrial or residential users.

In one embodiment, the land-based distribution system 1330 can include a chemical feed station (not shown) to adjust a plurality of water quality parameters. The chemical feed station can adjust water quality parameters such as pH, corrosion control, and fluoridation, as desired. Other suitable water quality parameters can be adjusted by the chemical feed station. In one embodiment, the chemical feed station is disposed upstream of the storage tanks 1333. In another embodiment, the chemical feed station is disposed downstream of the chemical feed station and upstream of the pumping station 1336. Alternatively, the chemical feed station can be disposed in other suitable locations.

In an alternate embodiment, the permeate can be transferred from the second vessel 1320 to a land-based transportation system (not shown) for delivery directly to end-users or alternate water storage facilities. The land-based transportation system can include a plurality of tank trucks or a trucking network (not shown). The land-based transportation system can include a railroad or a railroad network. Additionally, the land-based transportation system can include a combination of a trucking network and a railroad network.

Figure 14:
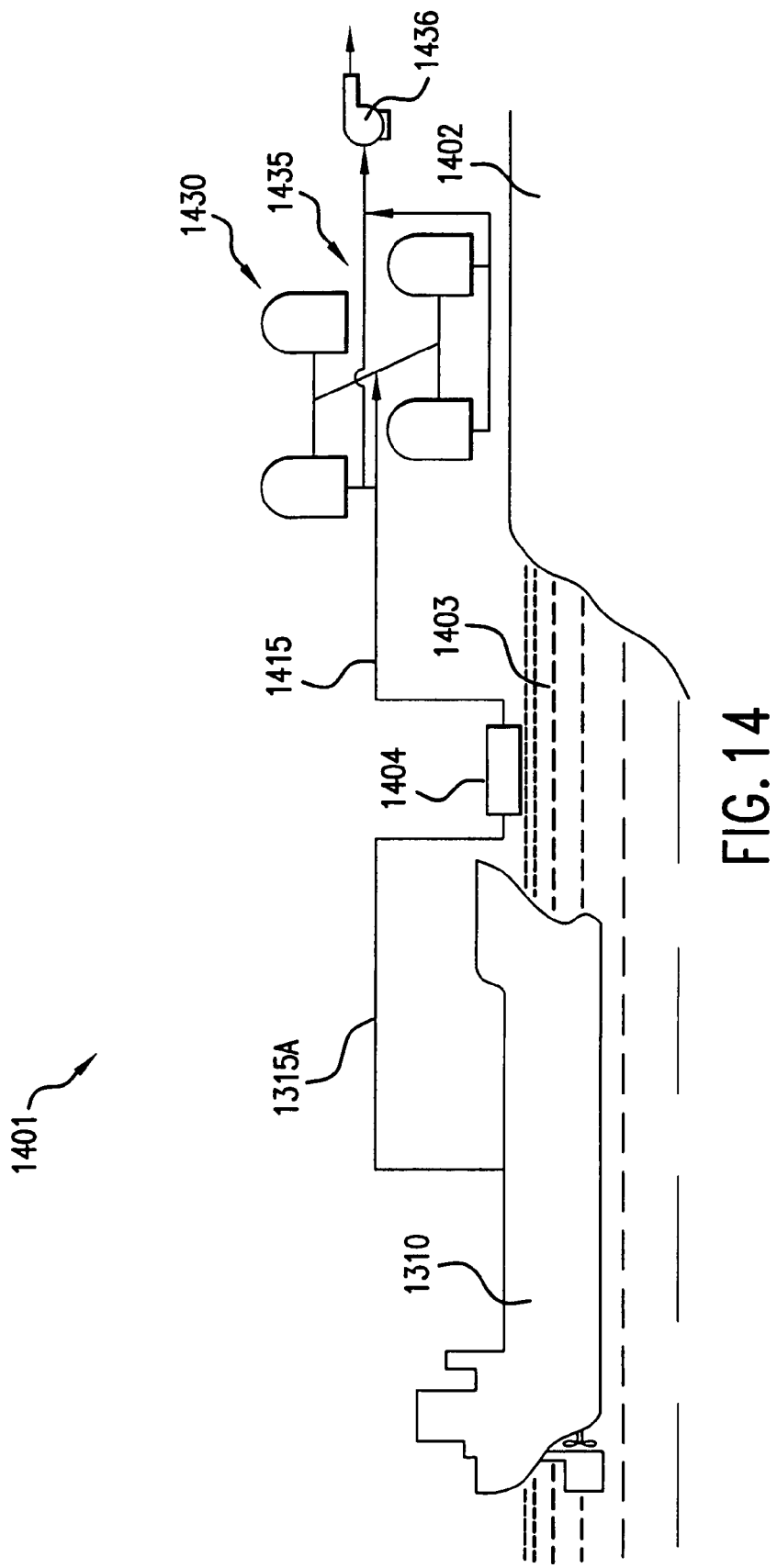
FIG. 14 is a schematic of a system according to another embodiment of the present invention.

Referring now to FIG. 14, an alternate permeate delivering means is shown. In one embodiment, the permeate can be transferred directly from the first vessel 1310 to a floating pipeline 1415. Floating pipelines to transfer oil are known. The floating pipeline 1415 can be similar in design to such floating pipelines.

The floating pipeline 1415 can be coupled to a permanent buoy 1404. The floating pipeline 1415 can be transported from shore 1302 to the buoy 1404 by a tugboat or other service vessel. The floating pipeline 1415 can be constructed of known buoyant materials or can be coupled with buoyant floats (not shown) disposed along its length. The floating pipeline 1415 can float on the surface of the water 1303. Alternatively, the floating pipeline 1415 can be partially submerged below the surface of the water 1303.

An alternate embodiment of the permeate delivering means includes a sea-floor stabilized pipeline (not shown). The sea-floor stabilized pipeline can be coupled to the permanent buoy 1404. The sea-floor stabilized pipeline is disposed primarily below the surface of the water 1303 and rests on the sea-floor. The sea-floor stabilized pipeline can have a plurality of weights distributed over its length to keep it generally in place. Alternatively, the sea-floor stabilized pipeline can be securely fixed to the sea-floor with known anchorage devices and methods.

A first end of the sea-floor stabilized pipeline can be disposed above the surface of the water 1303. The first end of the sea-floor stabilized pipeline is in communication with first vessel 1310. A second end of the sea-floor stabilized pipeline can be disposed proximate to the land-based distribution system 1330. In one embodiment, a portion of the sea-floor stabilized pipeline proximate to the first end passes through the permanent buoy 1404. In another embodiment, a portion of the sea-floor stabilized pipeline proximate to the first end is integral with the permanent buoy 1404.

Another alternate embodiment of the permeate delivering means includes a sea-floor embedded pipeline (not shown). The sea-floor embedded pipeline can be coupled to the permanent buoy 1404. The sea-floor stabilized pipeline is disposed primarily below the surface of the sea-floor. The sea-floor embedded pipeline is generally secured in place by the sea-floor. The sea-floor embedded pipeline can be buried several inches below a surface of the sea-floor. Alternatively, anchorage devices can be used to secure the sea-floor embedded pipeline. In another embodiment, the sea-floor embedded pipeline can be covered by various materials. Other structures and permeate delivering means may be used in other embodiments.

In one embodiment of the system 1301, the first vessel 1310 includes a packaging system (not shown) to package the permeate. The packaging system can include an on-board bottling plant. Alternatively, the packaging system can include other suitable packages, such as, for example, large plastic bladders. As described in more detail below, the packaged permeate can be transported to provide relief to a disaster stricken area on shore 1302. In addition to providing packaged desalinated water, the first vessel 1310 can include a store of disaster-relief provisions, such as food, medical supplies, and clothing.

To support the operation of the first vessel 1310, a support fleet (not shown) can be included. The support fleet is operable to provide the first vessel 1310 with one or more of the following: fuel oil, supplies and provisions, repair and replacement materials and equipment, personnel, and airlift capabilities. The support fleet can include a single vessel or a plurality of vessels.

Figure 15:
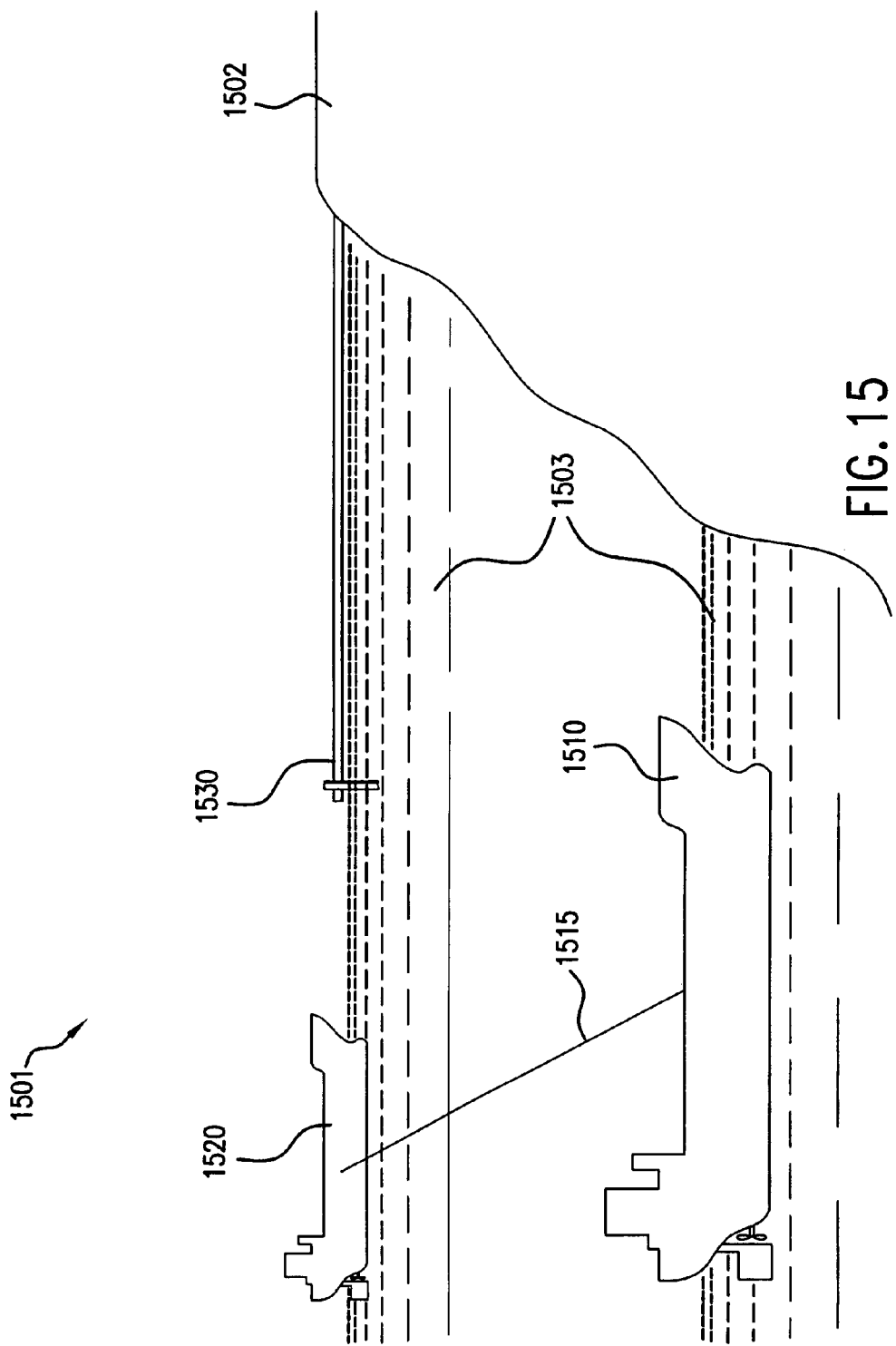
FIG. 15 is a schematic of a system according to another embodiment of the present invention.

Referring now to FIG. 15, a system 1501 for providing disaster relief services from a maritime environment according to the present invention is shown. The system 1501 described in further detail below is operable to provide critical aid to a wide variety of areas that lack sophisticated, well-developed, or functional ground infrastructure. Additionally, the system 1501 does not leave a "footprint" on shore 1302. Furthermore, the system 1501 is mobile and can respond to developing crises without much lead time or notice. This is especially true when the system 1501 is forward-deployed across the globe.

The system 1501 includes a first vessel 1510 operable to produce desalinated water. Generally, the first vessel 1510 is operable to produce desalinated water at a rate in a range between approximately 1 million gallons per day and approximately 100 million gallons per day. Typically the first vessel 1510 includes a reverse osmosis system. In one embodiment, the first vessel 1510 is operable to produce the desalinated water substantially continuously.

The first vessel 1510 can include a converted single-hull tanker and includes a first dead weight tonnage. The first dead weight tonnage includes a range between about 10,000 and 500,000 tons. In another embodiment, the first vessel 1510 has a dwt of between about 30,000 and 50,000. In another embodiment, the first vessel 1510 has a dwt of between about 65,000 and 80,000. In another embodiment, the vessel 1510 has a dwt of between about 120,000. In another embodiment, the first vessel 1510 has a dwt of between about 250,000 and 300,000. In other embodiments, the size of the first vessel 1510 may depend on the intended application, the controlling draft, and on the desired production capacity of the vessel.

The first vessel 1510 can be in continuous motion with respect to shore 1502. Generally, while the first vessel 1510 is in motion with respect to shore 1502, the first vessel 1510 can intake seawater 1503 to process through the reverse osmosis system. Alternatively, through the use of intake pumps and other known means, the first vessel 1510 can intake seawater 1503 while not in motion with respect to shore 1502.

To be in motion with respect to shore 1502, the first vessel 1510 can be underway. However, the first vessel 1510 can be in motion with respect to shore 1502 even though it is not underway. The first vessel 1510 can be in motion with respect to shore 1502 while moored, anchored, or drifting.

In one embodiment of the system 1501, the first vessel 1510 includes a packaging system (not shown) to package the desalinated water. The packaging system can include an on-board bottling plant. Alternatively, the packaging can include other suitable packages, such as, for example, large plastic bladders. The packaged permeate can be transported to shore 1502 to provide relief to a disaster stricken area. In addition to providing packaged desalinated water, the first vessel 1510 can include a store of disaster-relief provisions, such as food, medical supplies, and clothing.

The system 1501 also includes a means for delivering the desalinated water to shore 1502. In one embodiment, the delivering means includes a second vessel 1520. The second vessel 1520 includes a second tonnage in a range between about 10,000 and 500,000 dwt. The second vessel 1520 can include a converted single-hull tanker. The second vessel 1520 can also include a tug-barge unit. Alternatively, other suitable vessels can be used.

The second vessel 1520 is operable to receive the desalinated water from the first vessel 1510 and to deliver the desalinate water to shore 1502. As described in detail above, the first vessel 1510 can transfer the desalinated water to the second vessel 1520 by a transfer line 1515. Accordingly, this transfer process will not be repeated here. The second vessel 1520 is operable to receive the desalinated water from the first vessel 1510 while the first and second vessels 1510, 1520 are in motion with respect to shore 1502.

In an alternate embodiment, unprocessed or partially-processed raw water may be delivered from shore 1502 by, for example, the second vessel 1520 to the first vessel 1510 for processing or additional processing (i.e., refreshing the raw water). The water from the second vessel 1520 may be transferred to the first vessel 1510 by reversing the transfer process described above. Once the first vessel 1510 has processed or "refreshed" the water from ashore, the first vessel 1510 can transfer the desalinated or "refreshed" water to the second vessel 1520 for delivery to shore 1502.

Once the desired amount of desalinated water has been transferred from the first vessel 1510 to the second vessel 1520, the second vessel 1520 can transport the desalinated water proximate to the shore 1502. Typically, the second vessel 1520 will dock alongside a pier 1530. Alternatively, the second vessel 1520 can be an amphibious vehicle, in which case the second vessel 1520 can deliver the desalinated water directly to shore 1502. In yet another alternative embodiment, the first vessel 1510 or the second vessel 1520 can transfer packaged desalinated water to shore 1502 by off-loading the packaged water at the pier 1530 or dropping the packaged water overboard allowing the tide to carry the packaged water in to shore 1502.

In an alternate embodiment, the delivering means includes an airborne delivery system (not shown). The airborne delivery system is operable to transport needed aid faster and farther inland than conventional ground transportation means. Furthermore, some areas on shore 1502 may be accessible only by air.

In one embodiment, the airborne delivery system includes a helicopter (not shown). The helicopter can land on or hover above the first vessel 1510 or the second vessel 1520. The helicopter can be loaded with packaged water or it can transport pallets of the packaged water. In another embodiment, the airborne delivery system includes a seaplane. The seaplane can be directly loaded with packaged water and transport the packaged water inland to where it is needed. Other structures and delivery means may be used in other embodiments.

The system 1501 can provide other disaster relief services in addition to delivering desalinated water. As discussed above, the system 1501 can also provide food (such as, for example Meals Ready to Eat—MREs), medical supplies, and clothing. As discussed above, the system 1501 can include a support fleet (not shown) operable to provide the first vessel 1510 with one or more of the following: fuel, supplies and provisions, repair and replacement materials and equipment, personnel, and airlift capabilities. The support fleet can include a single vessel or a plurality of vessels. Furthermore, in addition to supporting the first vessel 1510, the support fleet can dispatch emergency personnel and additional emergency aid to shore 1502.

Figure 16:
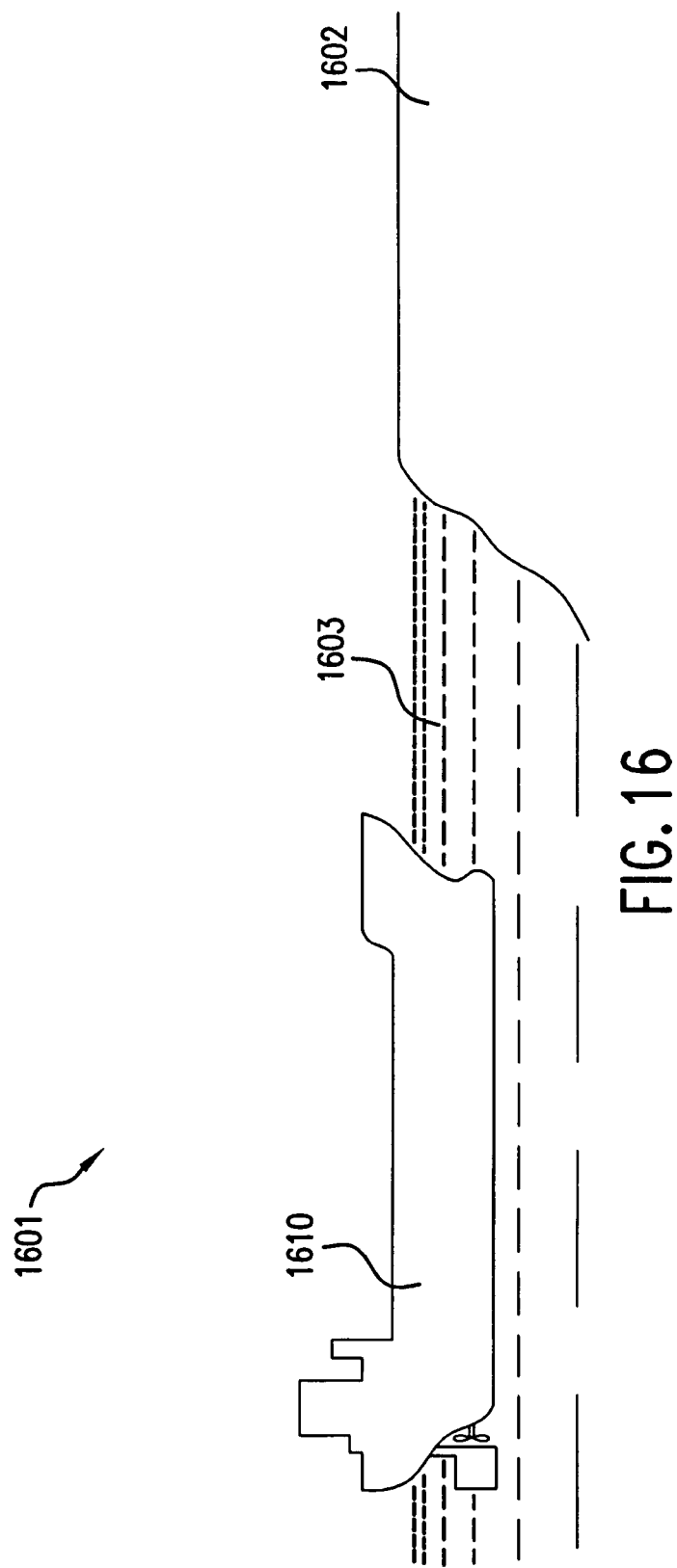
FIG. 16 is a schematic of a system according to another embodiment of the present invention.

Referring now to FIG. 16, a system 1601 for mitigating environmental impacts of a water purification system of a vessel 1610 on a maritime environment is shown. The water purification system (not shown) produces a permeate and a concentrate. The water purification system can be similar to that as described above. Alternatively, other suitable water purification systems can be used. Typically, the permeate produced includes desalinated water and the concentrate produced includes a brine.

In an embodiment, the system 1601 includes a mixing means for controlling the level of total dissolved solids of the concentrate discharged from the vessel 1610 into the surrounding body of water. As described above in greater detail, the mixing means is operable to dilute the concentrate and/or to regulate the temperature of the concentrate discharged from the vessel 1610.

In one embodiment, the system 1601 includes means for discharging the concentrate. Generally, the concentrate discharging means is operable to mix the concentrate with raw water prior to the discharge of concentrate to the surrounding body of water. In another embodiment, the concentrate discharging means is operable to mix the concentrate with water having a total dissolved solids below the level of total dissolved solids of the surrounding body of water prior to discharge. The concentrate discharging means can be similar to that described above.

In one embodiment, the concentrate discharging means includes a grate or other dispersing device. For example, the grate can include a plurality of divergently-oriented apertures. In another example, the grate can include a plurality of protrusions disposed in the plurality of apertures. The grate can be configured as described above and with reference to FIGS. 5A and 5B. Alternatively, the grating can be configured in other alternate means.

In another embodiment, the concentrate dispersing means includes a discharge member extending from the vessel and a plurality of orifices disposed in the discharge member. The discharge member can include a plurality of discharge tubes, each one of the tubes extending to a different depth. The discharge member can include a floating hose, which generally extends from the main deck of the vessel and into the water. The discharge member can also include a catenary. Other alternate dispersing means can be as that described above. Other suitable structures and dispersing means can be used.

In one embodiment, the system 1601 includes means for reducing a level of shipboard noise. For example, the noise reducing means includes a plurality of piping encasements. In another example, the noise reducing means includes a plurality of vibration dampening elements. Other systems for mitigating environmental impacts of a desalination system of a vessel on a maritime environment can be similar to those systems, apparatus, and methods described above. Alternatively, other suitable structures, systems, and means can be used.

Figure 17:
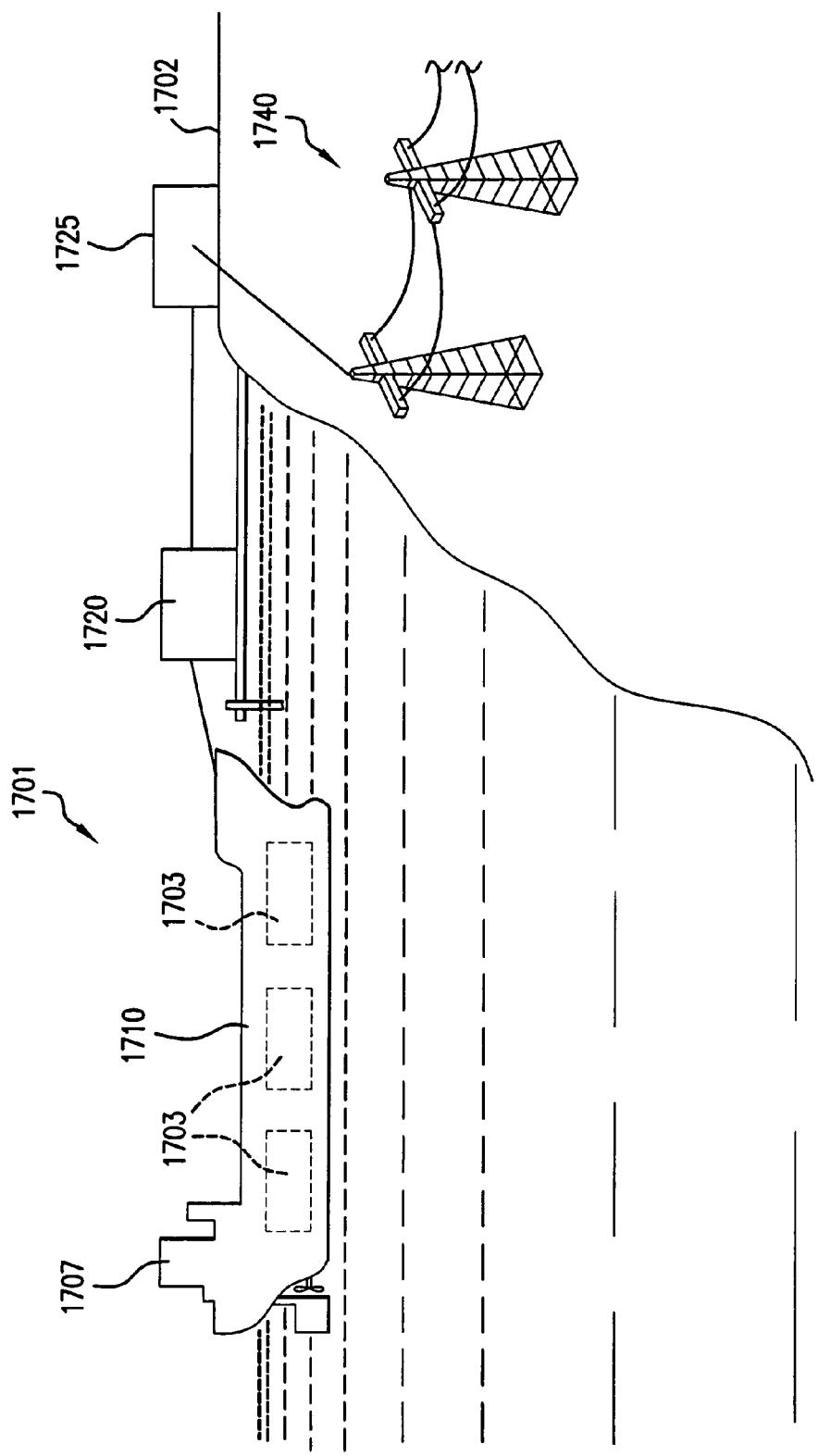
FIG. 17 is a schematic of a system according to another embodiment of the present invention.

Referring now to FIG. 17, a system 1701 for producing and transferring energy to a land-based distribution system is shown. The system 1701 comprises a vessel 1710. The vessel 1710 comprises means for producing energy 1703. The system 1701 also comprises a land-based means 1720 for transferring the energy from the vessel 1710 to a land-based distribution system 1740. In one embodiment, a capacity of the energy producing means 1703 comprises a range between about 10 megawatts and 100 megawatts.

In one embodiment, the vessel 1710 comprises a deadweight tonnage in a range between approximately 10,000 and 500,000. As described above, the vessel 1710 can be a reconfigured single-hull tanker. Other suitable vessels can be reconfigured, such as barges and other merchant vessels and retired (mothballed) naval vessels. Alternatively, the vessel 1710 can be custom built, i.e., designed and built especially for a particular application.

In one embodiment, the energy producing means 1703 comprises a supply transformer (not shown), a motor (not shown), a frequency converter (not shown), and a motor control (not shown). The frequency converter is operable to control a speed and a torque of the motor. Preferably the energy producing means 1703 comprises an electric drive propulsion drive, which is known in the art. Generally, the transformer is in communication with the motor and the frequency converter. Typically, the motor control is in communication with the transformer, the motor, and the frequency converter. The motor can be a drive motor or an electric motor generator.

Typically, the energy producing means 1703 is disposed entirely below the main deck. In an alternate embodiment, the energy producing means 1703 can be disposed on and above the main deck, as well as below the main deck. Moreover, the energy producing means 1703 can be supplemented by temporary electrical generators (not shown), such as, for example, diesel generators.

Preferably, the motor is an AC motor. The speed of the motor can be controlled by varying the voltage and frequency of its supply. The frequency converter is operable to create a variable frequency output. The frequency converter can also provide stepless control of three-phase AC currents from zero to maximum output frequency, corresponding to a desired shaft speed both ahead and astern. In another embodiment, the energy producing means comprises a fuel cell (not shown). Alternatively, other suitable energy producing means can be used, such as, for example, conventional maritime diesel engines, or nuclear or fossil-fueled steam plants.

The energy transferring means 1720 comprises means for synchronizing 1725 the energy from the vessel 1710 to the land-based distribution system 1740. As described above, the energy transferring means 1720 is a land-based, or shore-based, system. Utilizing a land-based energy transferring means 1720 rather than a ship-board energy transferring means allows the vessel 1710 to maximize its limited space for energy generation, and other additional functions. Additionally, a land-based energy transferring means 1720 is configured by the local energy authority to connect to the land-based distribution system 1740. Thus, the vessel 1710 would not have to be modified to accommodate variations among different grid systems.

In one embodiment, the synchronizing means 1725 comprises a generator step-up transformer (not shown) and a second converter (not shown). The generator step-up transformer is operable to step up a voltage from the vessel 1710 to a voltage substantially equal to the land-based distribution system 1740. For example, the generator step-up transformer can step-up the voltage from the vessel 1710, i.e., 600 V, to 38 kV, the voltage of the land-based distribution system 1740. In another example, the generator step-up transformer can step-up the voltage from the vessel 1710, i.e., 600 V, to 69 kV, the voltage of the land-based distribution system 1740.

The second converter is operable to synchronize the energy from the vessel 1710 with the land-based distribution system 1740. For example, the second converter can convert DC power from the vessel 1710 to the AC power of the land-based distribution system 1740. As another example, the second converter can convert the phase of the power from the vessel 1710 to the phase of the power in the land-based distribution system 1740.

The land-based distribution system 1740 can include an electrical grid or network to supply and transport electrical energy to commercial, industrial, and/or residential end-users. Such a land-based distribution system 1740 generally includes, but is not limited to, transmission towers, overhead and underground power lines, substations, transformers, converters, and wires, such as service drops. Alternatively, other suitable land-based distribution systems can be used.

In an embodiment, the vessel 1710 comprises means for cleaning exhaust 1707. Typically, exhaust refers to pollutants, as well as various particulates. The exhaust cleaning means 1707 is disposed upstream, or before the egress of exhaust from the vessel 1710. Exhaust from the vessel generally is produced in generating power. Of course, auxiliary shipboard functions may produce some additional exhaust. In one embodiment, the exhaust cleaning means 1707 comprises a scrubber. In another embodiment, the exhaust cleaning means 1707 comprises a particulate filter.

Figure 18:
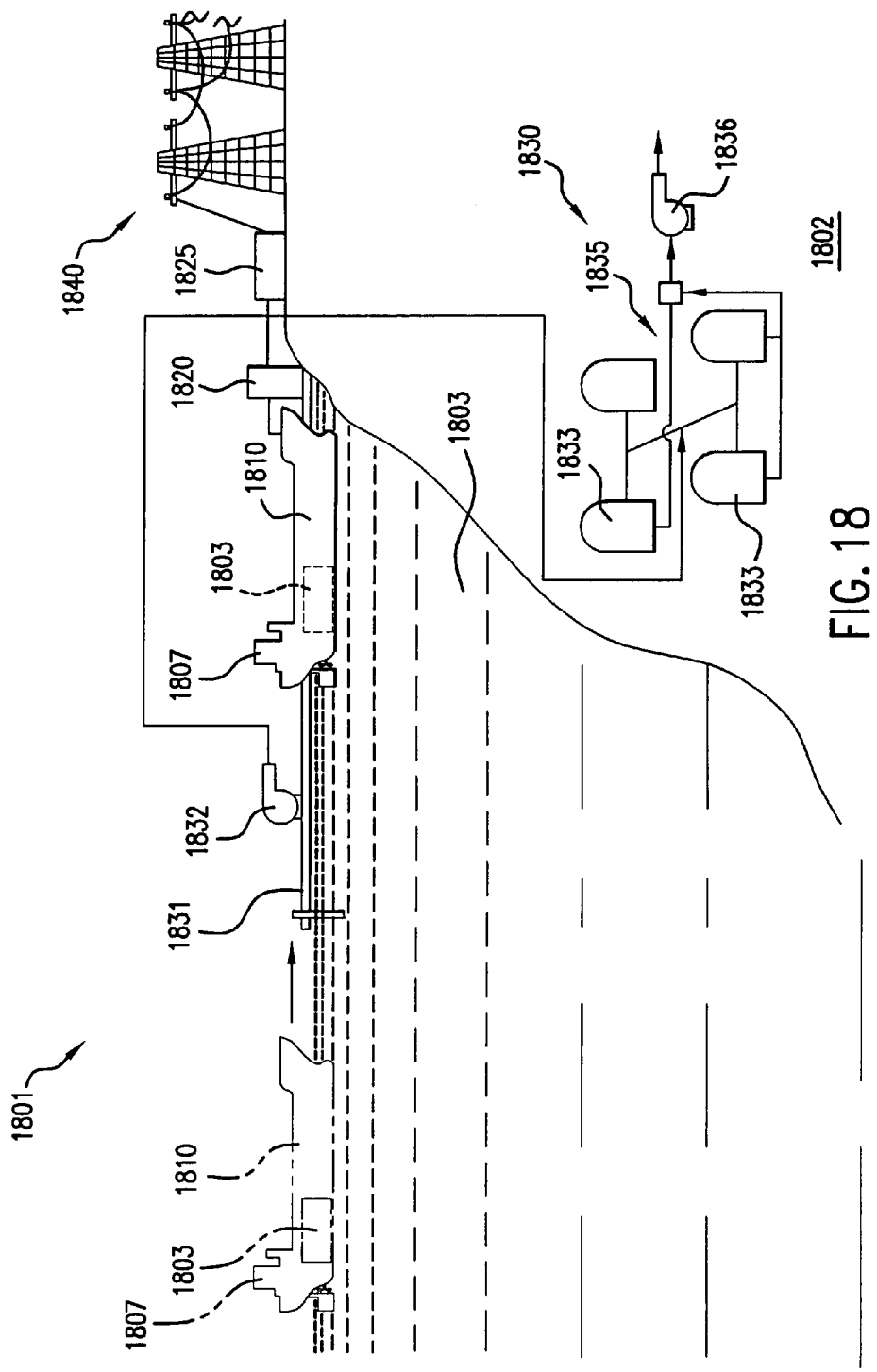
FIG. 18 is a schematic of a system according to another embodiment of the present invention.

Referring now to FIG. 18, a system 1801 is shown. The system 1801 comprises a vessel 1810 operable to produce desalinated water and electricity. The system 1801 also includes means for delivering (not shown) the desalinated water from the vessel 1810 to a land-based water distribution system 1830 and means for transferring 1820 the electricity from the vessel 1810 to the land-based electrical distribution system 1840.

In one embodiment, the vessel 1810 comprises a dead-weight tonnage in a range between about 10,000 and 500,000. As described above, the vessel 1810 can be a reconfigured single-hull tanker. Other suitable vessels can be reconfigured, such as barges and other merchant vessels. Alternatively, the vessel 1810 can be custom-made for this particular application.

Generally, the vessel 1810 is operable to produce desalinated water in a range between about 1 million gallons per day and 100 million gallons per day. Typically, the vessel 1810 produces desalinated water as described above, and thus, will not be repeated here. Alternatively, other suitable means of producing desalinated water can be used. Generally, a capacity of the vessel 1810 for producing electricity is in a range between about 10 megawatts and 100 megawatts.

While the vessel 1810 is producing desalinated water, the vessel 1810 generally is off-shore 1803. When the vessel 1810 has produced its capacity of desalinated water—or when the vessel 1810 has produced as much as is desired or needed—the vessel 1810 heads to shore 1802 and is secured to or moored proximate to a pier 1831. Delivery or discharge of the desalinated water to the land-based distribution system 1830 can take about 12 hours, which, of course, can vary depending on the amount of water to be delivered from the vessel 1810.

In one embodiment, the means for delivering the desalinated water from the vessel 1810 to the land-based water distribution system 1830 includes a piping system 1832. Alternatively, other suitable embodiments can be used. The piping system 1832 is in communication with the land-based water distribution system 1830.

The land-based water distribution system 1830 generally includes at least one water storage tank 1833, a pumping station 1836, and a pipeline or a pipeline network 1835. In one embodiment, the land-based distribution system can include a plurality of tanks 1833 located in a single tank-farm or be distributed over several locations on shore 1802. The pipeline network 1835 can interconnect the plurality of tanks 1833. Additionally, the pipeline network 1835 can communicate the water supply with individual pumping stations (not shown) and/or end-users (not shown), such as industrial or residential users.

In one embodiment, the land-based water distribution system 1830 can include a chemical feed station (not shown) to adjust a plurality of water quality parameters. The chemical feed station can adjust water quality parameters such as pH, corrosion control, and fluoridation, as desired. Other suitable water quality parameters can be adjusted by the chemical feed station. In one embodiment, the chemical feed station is disposed upstream of the storage tanks 1833. In another embodiment, the chemical feed station is disposed downstream of the chemical feed station and upstream of the pumping station 1836. Alternatively, the chemical feed station can be disposed in other suitable locations.

In an alternate embodiment, the desalinated water can be transferred from the vessel 1810 to a land-based transportation system (not shown) for delivery directly to end-users or alternate water storage facilities. The land-based transportation system can include a plurality of tank trucks or a trucking network (not shown). The land-based transportation system can include a railroad or a railroad network. Additionally, the land-based transportation system can include a combination of a trucking network and a railroad network.

While the vessel 1810 is delivering the desalinated water to a land-based water distribution system 1830, the vessel 1810 can generate electricity for transfer to a shore-based electrical distribution system 1840. Generally, one megawatt is sufficient to provide power to 1000 typical American homes. Thus, where the capacity of the vessel 1810 is 100 megawatts, the vessel 1810 can provide power to about 100,000 homes. In addition to providing desalinated water, the vessel 1810 can provide critically-need power to help alleviate suffering in disaster-stricken areas by providing power to hospitals and other emergency infrastructure, as well as to homes.

In one embodiment, the vessel 1810 comprises a supply transformer (not shown), a motor (not shown), a frequency converter (not shown), and a motor control (not shown). The frequency converter is operable to control a speed and a torque of the motor.

Preferably the supply transformer, the motor, the frequency converter, and the motor control comprise an electric generating means 1803. Generally, the transformer is in communication with the motor and the frequency converter. Typically, the motor control is in communication with the transformer, the motor, and the frequency converter.

Typically, the electric generating means 1803 is disposed entirely below the main deck. In an alternate embodiment, the electric generating means 1803 can be disposed on and/or above the main deck, as well as below the main deck. Moreover, the electric generating means 1803 can be supplemented by temporary electrical generators (not shown), such as, for example, diesel generators.

Preferably, the motor is an AC motor. The speed of the motor can be controlled by varying the voltage and frequency of its supply. The frequency converter is operable to create a variable frequency output. The frequency converter can also provide stepless control of three-phase AC currents from zero to maximum output frequency, corresponding to a desired shaft speed both ahead and astern. In another embodiment, the electric generating means 1803 comprises a fuel cell (not shown). Alternatively, other suitable energy producing means can be used, such as, for example, conventional maritime diesel engines.

The energy transferring means 1820 comprises means for synchronizing 1825 the energy from the vessel 1810 to the land-based distribution system 1840. As described above, the energy transferring means 1820 is a land-based, or shore-based, system.

In one embodiment, the synchronizing means 1825 comprises a generator step-up transformer (not shown) and a second converter (not shown). The generator step-up transformer is operable to step up a voltage from the vessel 1810 to a voltage substantially equal to the land-based distribution system 1840. For example, the generator step-up transformer can step-up the voltage from the vessel 1810, i.e., 600 V, to 38 kV, the voltage of the land-based distribution system 1840. In another example, the generator step-up transformer can step-up the voltage from the vessel 1810, i.e., 600 V, to 69 kV, the voltage of the land-based distribution system 1840.

The second converter is operable to synchronize the energy from the vessel 1810 with the land-based distribution system 1840. For example, the second converter can convert DC power from the vessel 1810 to the AC power of the land-based distribution system 1840. As another example, the second converter can convert the phase of the power from the vessel 1810 to the phase of the power in the land-based distribution system 1840.

In an embodiment, the vessel 1810 comprises means for cleaning exhaust 1807. Typically, exhaust refers to pollutants, as well as various particulates. The exhaust cleaning means 1807 is disposed upstream, or before the egress of exhaust from the vessel 1810. Exhaust from the vessel generally is produced in generating power. Of course, auxiliary shipboard functions may produce some additional exhaust. In one embodiment, the exhaust cleaning means 1807 comprises a scrubber. In another embodiment, the exhaust cleaning means 1807 comprises a particulate filter.

Figure 19B:
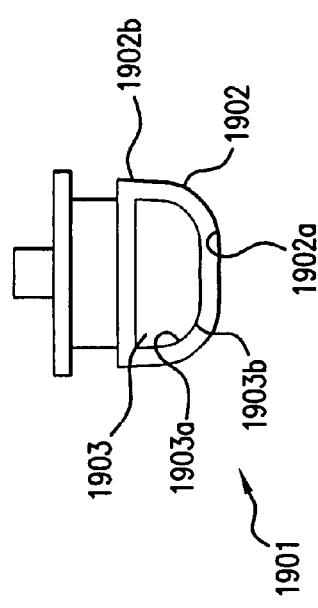
FIG. 19B is a sectional view taken along lines I-I of FIG. 19A.
Figure 19A:
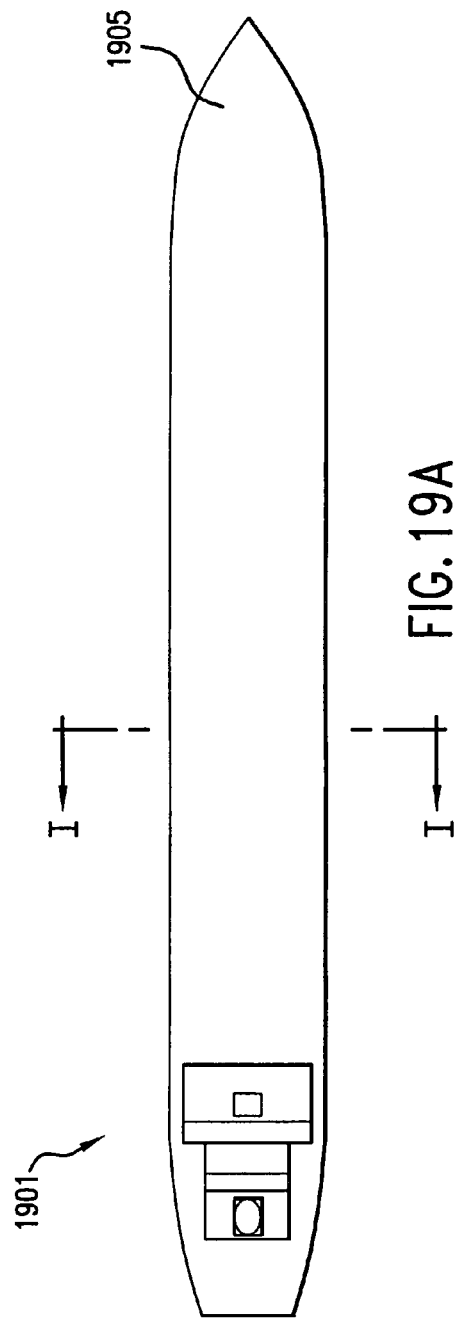
FIG. 19A is a top view of a vessel according to an embodiment of the present invention.

Referring now to FIGS. 19A and 19B, a vessel 1901 is shown. The vessel 1901 comprises a hull 1902. The hull 1902 comprises a first surface 1902a and a second surface 1902b. Generally, the first surface 1902a of the hull 1902 comprises an interior surface of the vessel 1901 and the second surface 1902b of the hull 1902 comprises an exterior surface of the vessel 1902. The vessel 1901 also comprises means for producing desalinated water (not shown) and means for mixing a concentrate with seawater (not shown). The mixing means and the means for producing desalinated water include the structures and methods described above for producing desalinated water. As shown in FIG. 19A, the means for producing desalinated water includes the plurality of reverse osmosis systems 1904 installed in separate containers disposed on and above the main deck 1905 of the vessel 1901. Alternatively, other suitable means for producing desalinated water can be used.

The vessel 1901 also includes means for storing the desalinated water. The water storing means comprises a tank 1903 disposed within the hull 1902. The tank 1903 can occupy a majority of the volume formed by the hull 1902 below the main deck 1905 of the vessel 1901. Alternatively, the tank 1903 can occupy other suitable volumes, and be disposed in suitable configurations. The tank 1903 comprises a first surface 1903a and a second surface 1903b. In a preferred embodiment, the tank 1903 is disposed within a double-hull of the vessel 1901. In another embodiment, the tank 1903 forms a double-hull of the vessel 1901. Double-hull generally refers to a second hull disposed within the hull 1902.

When the tank 1903 contains desalinated water, the first surface 1903a of the tank 1903 is disposed proximate to the desalinated water. Alternatively, the first surface 1903a of the tank 1903 is in communication with the desalinated water.

Generally, the second surface 1903b of the tank 1903 is disposed in facing opposition to the second surface 1902b of the hull 1902. The second surface 1903b of the tank 1903 is separated from the first surface 1902a of the hull 1902 by a distance. Typically, the distance between the second surface 1903b of the tank 1903 and the first surface 1902a of the hull 1902 is greater than or equal to about two meters. In another embodiment, the distance between the second surface 1903b of the tank 1903 and the first surface 1902a of the hull 1902 is less than about two meters. Alternatively, other suitable distances can be used.

In one embodiment, the vessel 1901 comprises means for maintaining a temperature (not shown) of the desalinated water in the tank 1903 above freezing. Desalinated water freezes at about 0 degrees C. In one embodiment, the means for maintaining the temperature of the desalinated water can include insulation disposed between the second surface 1903b of the tank 1903 and the first surface 1902a of the hull 1902. The insulation can be coupled to either or both the second surface 1903b of the tank 1903 and the first surface 1902a of the hull 1902.

In another embodiment, the temperature maintaining means can include forcing or circulating air between the second surface 1903b of the tank 1903 and the first surface 1902a of the hull 1902. The temperature of the air is sufficient to maintain the desalinated water in the tank 1903 above freezing. The air can be heated by electric coils or by other suitable means. In a further embodiment, the temperature maintaining means can include directly heating the tank 1903 by direct means, such as heating coils. The temperature maintaining means can also include imparting some movement or displacement of the desalinated water in the tank 1903, such as, for example, by an agitator. Other suitable means for maintaining the temperature of the desalinated water in the tank 1903 above freezing can be used.

The tank 1903 comprises at least one of the following: concrete, a plastic, a thermoplastic resin, a thermosetting resin, a polymerized ethylene resin, a polytetrafluoroethylene, a carbon steel, and a stainless steel. The stainless steel is selected from the group consisting of grade 304 stainless steel and grade 316 stainless steel.

In an embodiment where the tank 1903 comprises a carbon steel, a cladding can be coupled to the first surface 1903a of the tank 1903. Generally, the cladding is coupled when forming the tank 1903. Alternatively, the cladding can be coupled to the first surface 1903a of the tank 1903 after the tank 1903 has been formed. Typically, the cladding comprises the stainless steel, including grade 304 stainless steel and grade 316 stainless steel. In one embodiment, a sacrificial anode can be coupled to the second surface 1903b of the tank 1903. In another embodiment, an impressed electrical current can be utilized.

The first and second surfaces 1903a, 1903b of the tank 1903 can be treated with coatings to help maintain the desalinated water fit for human consumption. Various national codes and standards specify particular coatings for such tanks, such as, for example ANSI/AWWA D102-97. The first surface 1903a of the tank 1903 comprises a layer (not shown). The layer of the first surface 1903a comprises a first layer, a second layer, and a third layer. In one embodiment, the first layer is applied to the first surface 1903a as a prime coat. The second layer is applied to the first layer after the first layer has cured or dried. The third layer is applied to the second layer after the first layer has cured or dried. Thus, the second layer is disposed between the first and second layers.

The first layer of the first surface 1903a is selected from the group consisting of a two-component epoxy, a zinc-rich primer, a vinyl coating, a fast-drying coal-tar enamel coating, and a shop-applied primer. The second layer of the first surface 1903a is selected from the group consisting of a two-component epoxy, a vinyl resin coating, and a cold-applied coal tar coating. The third layer of the first surface 1903a is selected from the group consisting of a two-component epoxy, a vinyl resin coating, a hot-applied coal tar enamel, and a cold-applied coal tar coating. Alternatively, other suitable compounds for the first, second, and third layers of the first surface 1903a can be used.

The second surface 1903b of the tank 1903 comprises a layer (not shown). The layer of the second surface 1903b comprises a first layer, a second layer, and a third layer. In one embodiment, the first layer is applied to the second surface 1903b as a prime coat. The second layer is applied to the first layer after the first layer has cured or dried. The third layer is applied to the second layer after the first layer has cured or dried. Thus, the second layer is disposed between the first and second layers.

The first layer of the second surface 1903b is selected from the group consisting of a rust-inhibitive pigmented alkyd primer, a vinyl coating, a two-component epoxy, and a zinc-rich primer. The rust-inhibitive pigmented alkyd primer comprises a red iron oxide, a zinc oxide, an oil, and an alkyd primer. The second layer of the second surface 1903b is selected from the group comprising a ready-mixed aluminum coating, an alkyd enamel, an alkyd coating, a vinyl coating, and a two-component epoxy. The third layer of the second surface 1903b is selected from the group comprising a ready-mixed aluminum coating, an alkyd enamel, a vinyl coating, and a two-component aliphatic polyurethane coating. Alternatively, other suitable compounds for the first, second, and third layers of the second surface 1903b can be used.

FIGS. 17A-17C show embodiments of a method 1701 according to the present invention. The method 1701 may be employed to deliver desalinated water to a land-based distribution system, such as for example, the system 1330 shown in FIG. 13 and as described above. Items shown in FIG. 13 are referred to in describing FIGS. 17A-17C to aid understanding of the embodiment of the method 1701 shown. However, embodiments of methods according to the present invention may be employed in a wide variety of other systems.

Figure 20A:
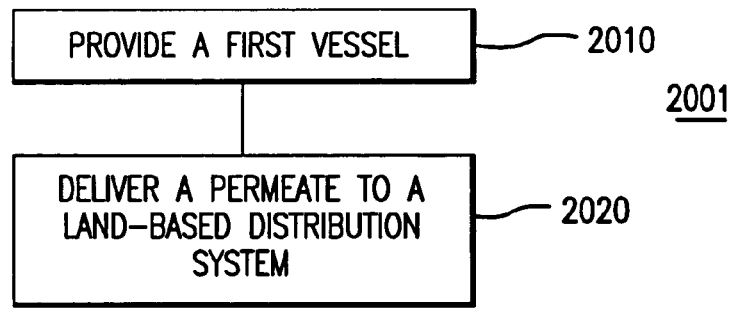
FIG. 20A is a diagram of a method according to an embodiment of the present invention.

Referring now to FIG. 20A, block 2010 indicates that a first vessel is provided. The first vessel can be similar to that described above. In one embodiment, the first vessel includes a converted single-hull tanker having a dead-weight tonnage in a range between about 10,000 tons and 500,000 tons. In another embodiment, the first vessel has a dwt of between about 30,000 and 50,000. In another embodiment, the first vessel 1710 has a dwt of between about 65,000 and 80,000. In another embodiment, the first vessel has a dwt of between about 120,000. In another embodiment, the first vessel has a dwt of between about 250,000 and 300,000. In other embodiments, the size of the first vessel will depend on the intended application, the maximum draft to keep the vessel afloat, and on the desired production capacity of the vessel. Alternatively, other suitable vessels can be used.

The first vessel is operable to produce a permeate and to mix a concentrate. As described herein, the permeate is produced from raw water, typically seawater. The permeate generally includes desalinated water and the concentrate includes a brine. In one embodiment, the method 2001 includes providing a reverse osmosis system. Typically, a rate of production of the permeate by the first vessel is in a range between approximately 1 million gallons per day and approximately 100 million gallons per day. In another embodiment, the first vessel is in continuous motion with respect to shore. In another embodiment, the first vessel is fixed with respect to shore. As described in more detail herein, one embodiment of the method 2001 includes diluting the concentrate to a level substantially equal to a salinity level of water proximate to the first vessel.

Figure 20B:
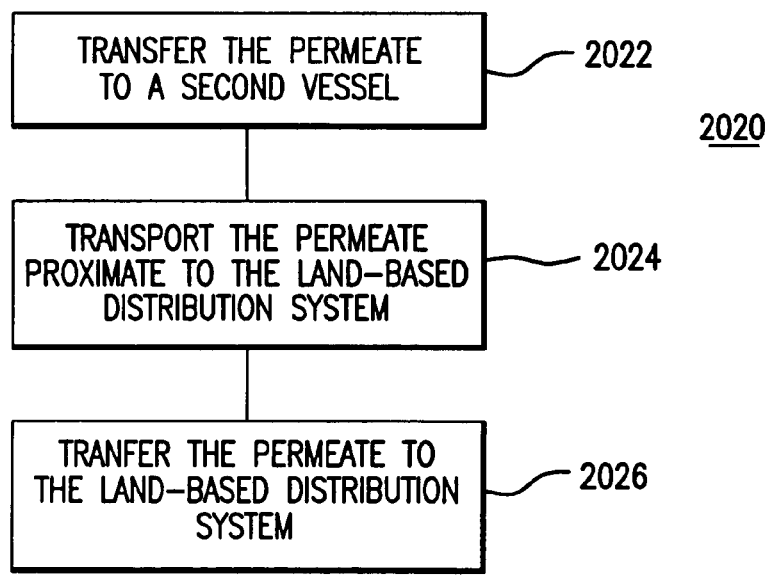
FIG. 20B is a diagram of another embodiment of the method of FIG. 17A.

Referring again to FIG. 20A, block 2020 indicates that the permeate is delivered from the first vessel to a land-based distribution system. Referring now to FIG. 20B, one embodiment for delivering the permeate from the first vessel to the land-based distribution system is shown. Block 2022 indicates that the step for delivering the permeate from the first vessel to the land-based distribution system includes transferring permeate from the first vessel to a second vessel.

In another embodiment, the method 2001 can include packaging the permeate. The permeate can be packaged as described above with reference to FIG. 13. Alternatively, other methods of packaging the permeate can be used. Once packaged, the permeate can be transported to shore by various methods, including for example, airborne delivery means. A helicopter or a seaplane can be used to transport packaged permeate to shore. The first vessel can include a helipad to accommodate that landing, loading, and departure of a helicopter.

In an embodiment, a dead-weight tonnage of the second vessel is in a range between about 10,000 and about 500,000. In one embodiment, the second vessel can be a converted single-hull tanker. In another embodiment, the second vessel can be a tug-barge unit. During the transfer of permeate from the first vessel to the second vessel, both the first and second vessels can be in motion with respect to shore. Alternatively, the first and second vessels can be substantially stationary with respect to shore. As described above, the permeate can be transferred from the first vessel to the second vessel using a transfer line. Using transfer lines to transfer fuel oil between ships is known. Transferring permeate between vessel can use similar principles.

As shown in FIG. 20B, block 2024 indicates that the step for delivering the permeate from the first vessel to the land-based distribution system includes transporting the permeate disposed in the second vessel proximate to the land-based distribution system. The second vessel can travel to a pier or a dock proximate to the shore under its own power or with the assistance of a tug or other suitable support vessel.

As shown in FIG. 20B, block 2026 indicates that the step for delivering the permeate from the first vessel to the land-based distribution system includes transferring the permeate from the second vessel to the land-based distribution system. The permeate can be transferred from the second vessel to the land-based distribution system, as described above and with reference to FIG. 13.

Generally, the permeate is transferred from the second vessel to the land-based distribution system through a transfer line that is in communication with a storage tank intake pump. The storage tank intake pump assists in the transfer of permeate to a storage tank. Alternatively, other suitable methods of transferring the permeate from the second vessel to the land-based distribution system can be used.

Figure 20C:
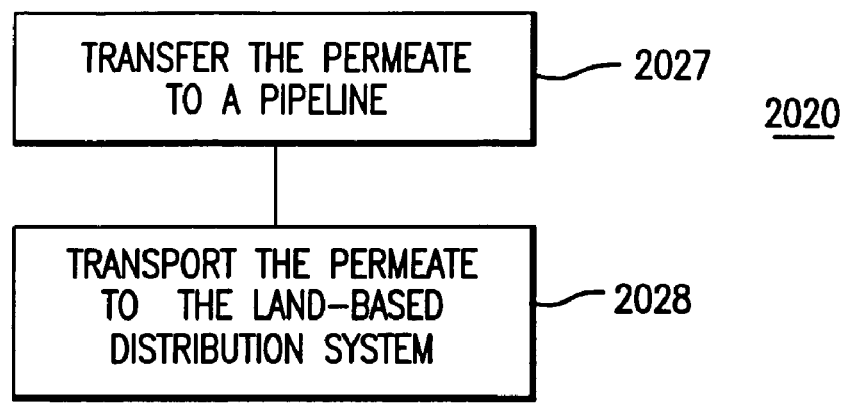
FIG. 20C is a diagram of another embodiment of the method of FIG. 17A.

Referring now to FIG. 20C, an alternate embodiment for delivering the permeate from the first vessel to the land-based distribution system is shown. As indicated by block 2027, the permeate is transferred from the first vessel to a pipeline. Transferring the permeate from the first vessel to the pipeline can be similar to that described above and with reference to FIG. 13.

For example, in one embodiment, the pipeline can include a floating pipeline spanning a distance from the first vessel or a permanent buoy to shore. In another embodiment, the pipeline can include a sea-floor stabilized pipeline similar to that described above. In yet another embodiment, the pipeline can include a sea-floor embedded pipeline similar to that described above with reference to FIG. 13. Alternatively, other suitable pipelines and configurations of pipelines can be used.

As indicated by block 2028, the permeate in the pipeline is transported proximate to the land-based distribution system. The permeate can be transported in the pipeline similar to that described above with reference to FIG. 13. Alternatively, other suitable methods of transporting the permeate can be used. Generally, a transfer pump coupled to the permanent buoy or the first vessel, provides the necessary pressure to transport the permeate proximate to shore.

In one embodiment, the method 2001 further comprises providing a storage tank. Generally, the storage tank is disposed on shore and stores the permeate for future transport and/or use. In one embodiment, there may be a plurality of storage tanks. In another embodiment, the method 501 further comprises communicating a pipeline or a pipeline network with the storage tank. In yet another embodiment, the method 1701 further includes communicating a pumping station with the pipeline or the pipeline network. Typically, a combination of a storage tank, a pipeline or a pipeline network in communication with the storage tank, and a pumping station in communication with the pipeline or the pipeline network comprises the land-based distribution system. The land-based distribution system can be similar to that described above and with reference to FIG. 13. Alternatively, other suitable configurations and arrangements can be used.

In one embodiment, the method 2001 further comprises communicating a chemical feed station to the storage tank. The chemical feed station is operable to adjust a plurality of water quality parameters, such as, for example, pH, corrosion control, and fluoridation. The water can be transported to end-users, such as industrial or residential users, directly from the storage tank and pipeline network. Alternatively, the water can be transported by providing a land-based transportation system. In one embodiment, the land-based transportation system can include a railroad or a railroad network. In another embodiment, the land-based transportation system can include a tank truck or a trucking network.

Figure 21:
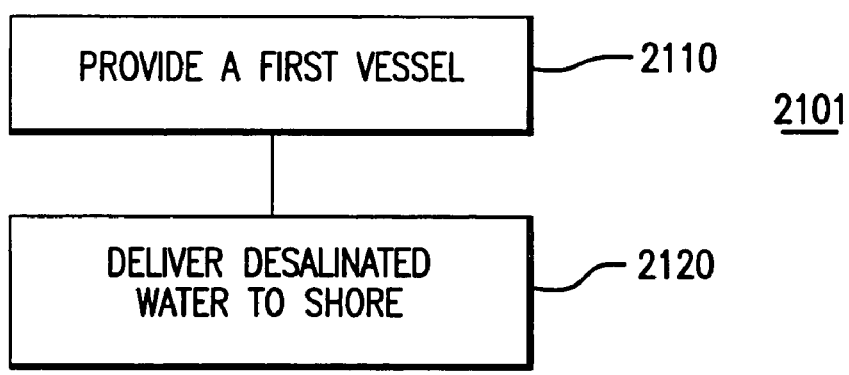
FIG. 21 is a method according to another embodiment of the present invention.

FIG. 21 shows an embodiment of a method 2101 according to the present invention. The method 2101 may be employed to provide aid to a disaster-stricken area. Items shown in FIG. 14 are referred to in describing FIG. 21 to aid understanding of the embodiment of the method 2101 shown. However, embodiments of methods according to the present invention may be employed in a wide variety of other systems.

As indicated by block 2110, the method 2101 includes providing a first vessel having a first tonnage. In one embodiment, the first vessel includes a converted single-hull tanker having a first tonnage in a range between about 10,000 and 500,000. In another embodiment, the first vessel has a dwt of between about 30,000 and 50,000. In another embodiment, the first vessel has a dwt of between about 65,000 and 80,000. In another embodiment, the first vessel has a dwt of between about 120,000. In another embodiment, the first vessel has a dwt of between about 250,000 and 250,000. In other embodiments, the size of the first vessel will depend on the intended application, the minimum draft to keep the vessel afloat, and on the desired production capacity of the vessel. Alternatively, other suitable vessels can be used, including those similar to that described above with reference to FIGS. 13-16.

The first vessel is operable to produce desalinated water. Generally, the first vessel includes a reverse osmosis system operable to produce desalinated water at a rate in a range between approximately 1 million gallons per day and approximately 100 million gallons per day. In one embodiment, the first vessel is in continuous motion with respect to shore. Alternatively, the first vessel is stationary with respect to shore. The desalinated water can be produced using methods and apparatus similar to that described above. Other suitable methods for producing desalinated water can be used.

In another embodiment, the method 2101 includes packaging the desalinated water. For example, the first vessel can include a packaging plant. Generally, the method 2101 includes providing a store of disaster relief provisions, such as for example, food, medicine, and clothing.

As indicated by block 2120, the method 2101 of providing aid to a disaster-stricken area also includes delivering the desalinated water to shore. In one embodiment, the method 2101 includes providing a second vessel operable to receive the desalinated water from the first vessel and to deliver the desalinated water to shore. The second vessel includes a second tonnage. Typically, the second tonnage is less than the first tonnage. The second tonnage can be in a range between about 10,000 and 500,000 dwt. Other suitable vessels can be used, such as those similar to that described above.

In one embodiment, the second vessel is operable to receive the desalinated water from the first vessel while the first and second vessels are in motion with respect to shore. Alternatively, the second vessel can receive the desalinated water from the first vessel while the first and second vessels are substantially stationary with respect to shore. The means of transferring desalinated water from the first vessel to the second vessel can be similar to that described above. Alternatively, other suitable means for transferring desalinated water between the first and second vessels can be used. Once the desired amount of desalinated water has been received by the second vessel, the second vessel can transport the desalinated water proximate to shore for distribution to the disaster-stricken area.

As disaster-stricken areas often lack or have compromised land-based distribution systems, an alternate method 2120 of delivering desalinated water to shore includes providing an airborne vehicle. Disaster-stricken areas are often accessible only by air. In one embodiment, the airborne vehicle includes a helicopter. In another embodiment, the airborne vehicle includes a seaplane. The airborne vehicle is operable to transport packaged desalinated water as well as the disaster-relief provisions. Other alternate methods of delivering the desalinated water include simply throwing packaged desalinated water overboard. The packaged water can float to shore or be collected by other vessels.

In the case of a helicopter, the helicopter is operable to transport several discrete packages or to transport pallets of the packaged desalinated water. In one embodiment, the first vessel can include a helipad to facilitate the flight operations and capabilities of the helicopter. Typically, there can be a plurality of airborne vehicles. The airborne vehicles can originate from shore or other vessels.

The method 2101 includes providing a plurality of support vessels. The support vessels are operable to provide the first vessel with one or more of the following: fuel, supplies and provisions, repair and replacement materials and equipment, personnel, and airlift capabilities.

Figure 22:
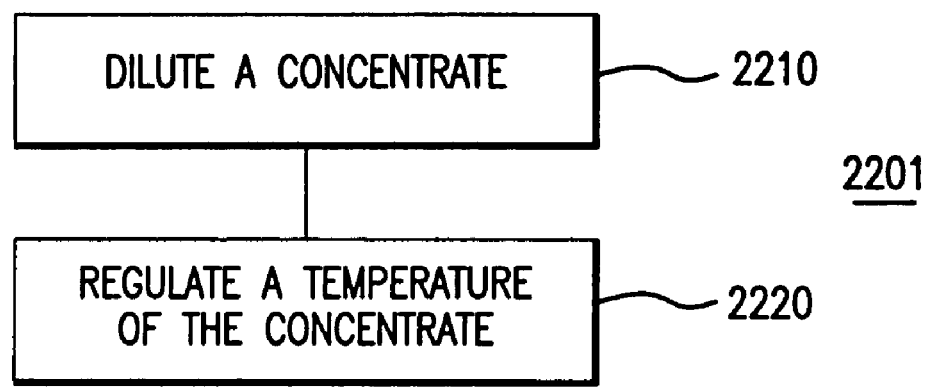
FIG. 22 is a method according to another embodiment of the present invention.

FIG. 22 shows an embodiment of a method 2201 according to the present invention. The method 2201 may be employed to mitigate environmental impacts of desalinating water. Items shown in FIG. 16 are referred to in describing FIG. 22 to aid understanding of the embodiment of the method 1901 shown. However, embodiments of methods according to the present invention may be employed in a wide variety of other systems.

The process of desalinating water produces a permeate and a concentrate. Block 2210 indicates that the method 2201 includes diluting a concentrate. The total dissolved solids of the diluted concentrate is between the total dissolved solids of the concentrate and the total dissolved solids of the native water. Generally, the concentrate is mixed with water taken directly from the surrounding body of water (i.e. "native water") before discharging the concentrate to the water of the maritime environment in which the vessel is operating. As indicated by block 2220, the method also includes regulating a temperature of the concentrate substantially equal to a temperature of the water proximate the area of the concentrate discharge.

In one embodiment, the method 2201 includes providing a mixing tank. Generally, the mixing tank is disposed in a volume of a vessel. As described in more detail above, the mixing tank is operable to mix the concentrate with native water prior to discharging the concentrate into the water of the maritime environment in which the vessel is operating. In an embodiment, the mixing tank is similar to that described herein and with reference to FIG. 9. Alternatively, other suitable mixing tanks can be used.

In one embodiment, the method 2201 includes dispersing the concentrate. Generally, the concentrate is dispersed as it is discharged into the water of the maritime environment in which the vessel is operating. The method 2201 further includes providing a grate. In one embodiment, the method 1901 includes providing a grate. In another embodiment, the method 2201 further comprises disposing a plurality of divergently-oriented apertures in the grate. The concentrate dispersing means can be similar to that described above. In yet another embodiment, the method 2201 further comprises providing the grate with a plurality of apertures and disposing a plurality of protrusions in the plurality of apertures. In an embodiment, the grate is configured as described above and with reference to FIGS. 5A and 5B. Alternatively, the grate can be configured in other suitable alternate means.

In one embodiment, the method 2201 includes discharging the concentrate from a plurality of locations. The method 2201 can include providing a concentrate discharge member. The method 2201 can also include providing a plurality of orifices disposed in the concentrate discharge member. For example, the discharge member can extend from the vessel and a plurality of orifices disposed in the discharge member. The discharge member can also include a plurality of discharge tubes, each one of the tubes extending to a different depth.

The discharge member can include a floating hose, which generally extends from the main deck of the vessel and into the water. The discharge member can further include a catenary. Other alternate methods of discharging the concentrate can be as that described above. Furthermore, other suitable methods of discharging the concentrate can be used.

In one embodiment, the method 2201 includes reducing a level of operating noise. The method 2201 can include providing a plurality of piping encasements. In another embodiment, the method includes providing a plurality of dampening members. Other methods for mitigating environmental impacts of a desalination system of a vessel on a maritime environment can be similar to those methods, systems, and apparatus, as described herein. Alternatively, other suitable methods can be used.

Figure 24:
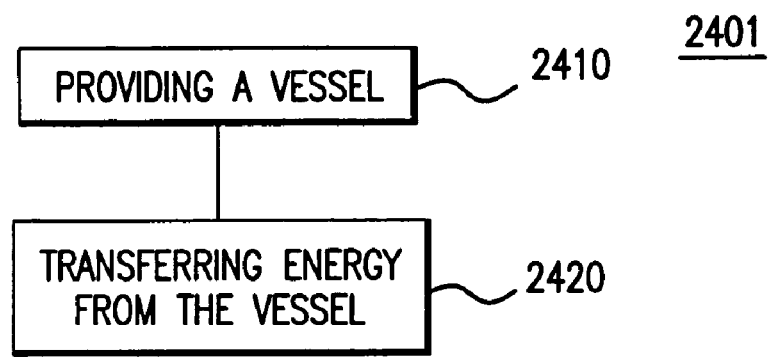
FIG. 24 is a method according to another embodiment of the present invention.

Referring now to FIG. 24, an embodiment of a method 2401 according to the present invention is shown. The method 2401 may be employed to transfer electricity to a land-based distribution system, such as for example, the system 1701 shown in FIG. 17 and as described above. Items shown in FIG. 17 are referred to in describing FIG. 24 to aid understanding of the embodiment of the method 2401 shown. However, embodiments of methods according to the present inventions may be employed in a wide variety of other systems.

As shown by block 2410, the method 2410 comprises providing a vessel operable to generate energy is provided. The vessel can be as that described above. In one embodiment, the vessel comprises a dead-weight tonnage in a range between about 10,000 and 500,000. Alternatively, other suitable vessels can be provided.

Generally, the vessel is operable to generate electricity in a range between about 10 megawatts and 100 megawatts. Typically, the vessel comprises a supply transformer, a motor, a frequency converter, and a motor control. The frequency converter is operable to control a speed and a torque of the motor. In another embodiment, the vessel comprises a fuel cell. Alternatively, other suitable means of energy production can be used.

Where the vessel is powered by fossil fuels, the vessel can include means to mitigate the environmental consequences of burning such fuel. For example, in one embodiment, the method 2410 comprises cleaning an exhaust from the vessel. In another embodiment, the method 2410 comprises providing a scrubber. In an alternate embodiment, the method 2410 comprises providing a particulate filter. Alternatively, other suitable means for cleaning pollutants from the vessel can be provided.

As shown in block 2420, the method 2410 comprises transferring the energy from the vessel to a land-based distribution system. Transferring the energy from the vessel can be as that described above and with reference to FIG. 17. Alternatively, other suitable methods of transferring energy from the vessel can be used. The land-based distribution system can be similar to that described above and with reference to FIG. 17. Alternatively, other suitable land-based distribution systems can be used.

As described above, the equipment for transferring energy from the vessel is generally shore-based, and is configured by the local power authority to its specific grid configuration and specifications. In one embodiment, the method 2410 comprises synchronizing the energy from the vessel to the land-based distribution system. The step of synchronizing the energy from the vessel to the land-based distribution system comprises stepping-up a voltage from the vessel to a voltage substantially equal to the land-based distribution system and providing a second converter operable to synchronize the energy from the vessel with the land-based distribution system. Other suitable methods for synchronizing the energy from the vessel to the land-based distribution system can be used, including those methods and systems described above. Alternatively, other suitable methods for synchronizing the energy from the vessel to the land-based distribution system can be used.

Figure 25:
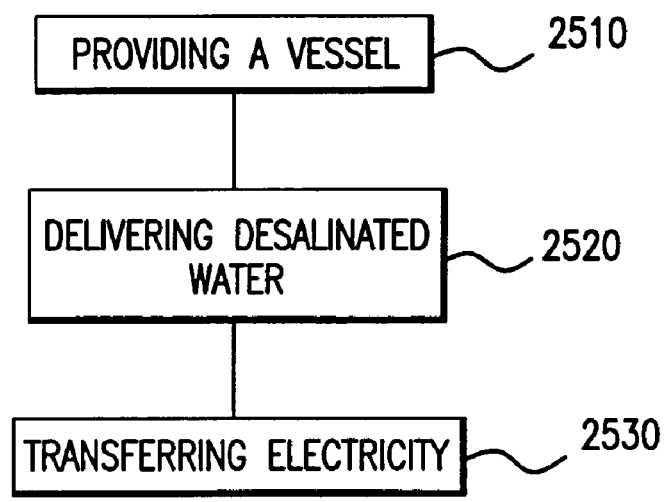
FIG. 25 is a method according to another embodiment of the present invention.

Referring now to FIG. 25, an embodiment of a method 2501 according to the present invention is shown. The method 2501 may be employed to deliver desalinated water and to transfer electricity to land-based distribution systems, such as for example, the system 1801 shown in FIG. 18 and as described above. Items shown in FIG. 18 are referred to in describing FIG. 25 to aid understanding of the embodiment of the method 2501 shown. However, embodiments of methods according to the present inventions may be employed in a wide variety of other systems.

As shown by block 2510, the method 2410 comprises providing a vessel operable to produce desalinated water and to generate electricity. The vessel can be as that described above. In one embodiment, the vessel comprises a dead-weight tonnage in a range between about 10,000 and 500,000. Alternatively, other suitable vessels can be provided. Typically, the vessel is operable to produce desalinated water in a range between about 1 million and 100 million gallons per day. Generally, the vessel is operable to generate electricity in a range between about 10 megawatts and 100 megawatts. Alternatively, other suitable vessels can be used.

Typically, the vessel comprises a supply transformer, a motor, a frequency converter, and a motor control. The frequency converter is operable to control a speed and a torque of the motor. In another embodiment, the vessel comprises a fuel cell. Alternatively, other suitable means of energy production can be used.

Where the vessel is powered by fossil fuels, the vessel can include means to mitigate the environmental consequences of burning such fuel. For example, in one embodiment, the method 2510 comprises cleaning an exhaust from the vessel. In another embodiment, the method 2510 comprises providing a scrubber. In an alternate embodiment, the method 2510 comprises providing a particulate filter. Alternatively, other suitable means for cleaning pollutants from the vessel can be provided.

As shown in block 2520, the method 2510 comprises delivering the desalinated water produced by the vessel to a land-based water distribution network. The land-based water distribution network can be as that described above and with reference to FIG. 18. Alternatively, other suitable water distribution networks can be used.

As shown in block 2530, the method 2510 comprises transferring the electricity generated by the vessel to a land-based electrical distribution system. Transferring the energy from the vessel can be as that described above and with reference to FIG. 18. Alternatively, other suitable methods of transferring energy from the vessel can be used. The land-based electrical distribution system can be similar to that described above and with reference to FIG. 18. Alternatively, other suitable land-based electrical distribution systems can be used.

As described above, the equipment for transferring energy from the vessel is generally shore-based, and is configured by the local power authority to its specific grid configuration and specifications. In one embodiment, the method 2510 comprises synchronizing the energy from the vessel to the land-based electrical distribution system. The step of synchronizing the energy from the vessel to the land-based electrical distribution system comprises stepping-up a voltage from the vessel to a voltage substantially equal to the land-based distribution system and providing a second converter operable to synchronize the energy from the vessel with the land-based electrical distribution system. Other suitable methods for synchronizing the energy from the vessel to the land-based electrical distribution system can be used, including those methods and systems described above. Alternatively, other suitable methods for synchronizing the energy from the vessel to the land-based electrical distribution system can be used.

Figure 26:
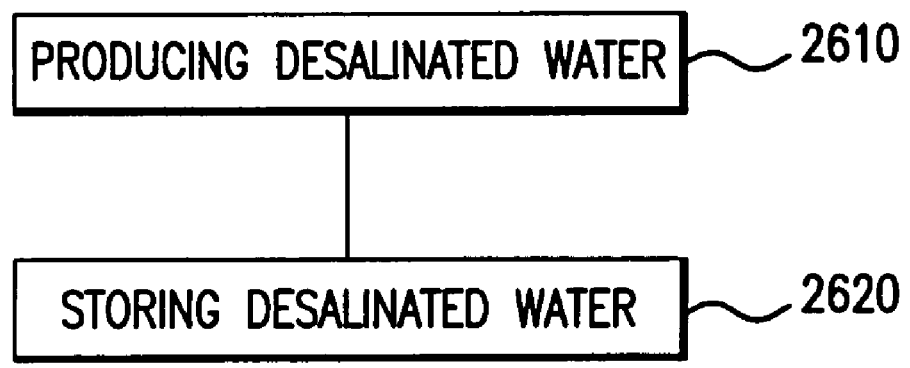
FIG. 26 is a method according to another embodiment of the present invention.

Referring now to FIG. 26, a method 2601 according to an embodiment of the present invention is shown. The method 2601 may be employed to produce and store Items shown in FIG. 19 are referred to in describing FIG. 26 to aid understanding of the embodiment of the method 2601 shown. However, embodiments of methods according to the present inventions may be employed in a wide variety of other systems.

As shown by block 2610, the method 2601 comprises producing desalinated water. The desalinated water can be produced using systems and methods as described above. Generally, the desalinated water is produced by a ship-board desalination system. Alternatively, the desalinated water can be produced by other suitable means.

As shown by block 2620, the method 2601 comprises storing the desalinated water in a tank. The tank is disposed in the hull of a vessel. The hull comprises a first surface and a second surface. The tank comprises a first surface and a second surface. The second surface of the tank is separated from the first surface of the hull. The hull and the tank can be as that described above with reference to FIG. 19.

In one embodiment of the method 2601, the first surface of the hull comprises an interior surface of the vessel and the second surface of the hull comprises an exterior surface of the vessel. Where there is desalinated water in the tank, the first surface of the tank is disposed proximate to the desalinated water. Alternatively, the first surface of the tank is in communication with the desalinated water. Generally, the second surface of the tank is separated from the interior surface of the hull by a distance, the distance being greater than or equal to about two meters. In another embodiment, the distance can be less than about two meters. Generally, the hull and the tank form a double-hull vessel. Alternatively, other suitable hull and tank can be used.

Typically, the tank comprises at least one of the following: a plastic, a thermoplastic resin, a thermosetting resin, a polymerized ethylene resin, a polytetrafluoroethylene, a carbon steel, and a stainless steel. The stainless steel is selected from the group consisting of grade 304 stainless steel and grade 316 stainless steel. In one embodiment, the method 2601 comprises coupling a cladding to the first surface of the tank. The cladding generally comprises the stainless steel. In another embodiment, the method 2601 comprises coupling a sacrificial anode to the second surface of the tank. In an alternate embodiment, the first and second surfaces of the tank each comprise a layer. The layer comprises a first layer, a second layer, and a third layer. The layers can be as that described above and with reference to FIG. 19. Alternatively, other suitable layers can be used.

In one embodiment, the method 2601 comprises maintaining a temperature of the desalinated water disposed in the tank above freezing. The method 2601 can include disposing insulation between the second surface of the tank and the first surface of the hull. The method 2601 can also include heating a space between the second surface of the tank and the first surface of the hull. Alternatively, other methods for maintaining the temperature of the desalinated water disposed in the tank above freezing can be used, including those systems and methods described above.

The systems, methods, and devices described above can be combined to provide a flotilla or fleet of vessels with varying functions, such as vessels that exclusively produce electricity and vessels that desalinate water. In such a fleet, the individual vessels can support one another. For example, the electric-producing vessel can provide or supplement the energy needs of the desalinated-water producing vessel. Additionally, the fleet can also include vessels to store and transport the desalinated water to shore or to other vessels. Such a fleet can provide multiple services (as well as relief to areas suffering from water and/or energy shortages) to shore-based areas. Of course, the individual vessels can also include multiple functions, such as water production, energy production, and/or water storage. In one embodiment, electrical power can be supplied to a vessel from ashore by, for example, buried cable, such that the vessel does not need its own power plant.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A system for desalinating seawater to yield desalinated water and a concentrate, the system comprising:
   a first sea-going vessel comprising a hull and being positioned on the surface of a body of seawater;
   a water desalination system installed on the first sea-going vessel, the water desalination system capable of removing salt from seawater;
   a water intake system installed on the first sea-going vessel and comprising an apparatus for taking up seawater from the body of seawater, the apparatus comprising at least one water intake positioned in the body of seawater;
   a mixing system for mixing the concentrate with seawater to yield a diluted concentrate, the mixing system being installed on the first sea-going vessel in communication with the water desalination system and comprising a space in which concentrate can be mixed with seawater to form the diluted concentrate, an inlet for introducing concentrate into the space, an inlet for introducing seawater into the space, and an outlet for discharging the diluted concentrate from the space; and
   a concentrate discharge system for discharging the diluted concentrate from the first sea-going vessel, the concentrate discharge system being installed on the first sea-going vessel and comprising at least one discharge port,
   wherein the mixing system is integrated with the concentrate discharge system, and comprises a concentrate discharge member extending from the hull into the body of seawater, the concentrate discharge member comprising (a) a conduit through which concentrate can flow from the water desalination system to the body of seawater and (b) an aspirator though which seawater from the body of seawater can be drawn into the concentrate discharge member by the Venturi effect to mix with concentrate in the conduit.

2. The system of claim 1, wherein the first sea-going vessel has a draught to more than 10 meters and the apparatus for taking up seawater from the body of seawater comprises a sea chest formed in the lower portion of the hull of the first sea-going vessel.

3. The system of claim 1, wherein the apparatus for taking up seawater from the body of seawater comprises a water intake member extendible from the hull into the body of seawater, wherein the water intake is on the distal end of the water intake member.

4. The system of claim 1, wherein the water intake is movable such that the water intake system can intake water from various depths to reduce the intake of plankton.

5. The system of claim 1, wherein the first sea-going vessel comprises a sea chest formed in the lower portion of the hull of the first sea-going vessel and a water intake member extendible from the hull into the body of seawater, and the water intake system can utilize either the sea chest or the water intake member to intake seawater.

6. The system of claim 1, wherein the first sea-going vessel comprises at least one selected from the group consisting of (i) a means for regulating the salinity level of the concentrate to a level substantially equal to the salinity level of the seawater at the area where the concentrate is discharged and (ii) a means for regulating the temperature of the concentrate substantially equal to the temperature of the seawater at the area where the concentrate is discharged.

7. The system of claim 6, wherein the first sea-going vessel comprises both (i) the means for regulating the salinity level of the concentrate to a level substantially equal to the salinity level of the seawater at the area where the concentrate is discharged and (ii) the means for regulating the temperature of the concentrate substantially equal to the temperature of the seawater at the area where the concentrate is discharged.

8. A system for desalinating seawater to yield desalinated water and a concentrate, the system comprising:
   a first sea-going vessel being positioned on the surface of a body of seawater;
   a water desalination system installed on the first sea-going vessel and capable of removing salt from seawater to yield desalinated water and concentrate;
   a water intake system installed on the first sea-going vessel in fluid communication with the water desalination system and comprising an apparatus for taking up seawater from the body of seawater, the apparatus positioned in the body of seawater at a first depth relative to the surface of the body of seawater; and
   a concentrate discharge system for discharging the concentrate from the first sea-going vessel, the concentrate discharge system being installed on the first sea-going vessel in fluid communication with the water desalination system and comprising at least one discharge member positionable in the body of seawater and comprising (a) a conduit through which concentrate can flow from the water desalination system to the body of seawater and (b) an aspirator through which seawater from the body of seawater can be drawn into the discharge member to mix with concentrate in the conduit.

9. The system of claim 8, wherein the first sea-going vessel has a draught to more than 10 meters and the apparatus for taking up seawater from the body of seawater comprises a sea chest formed in the lower portion of the hull of the first sea-going vessel.

10. The system of claim 8, wherein the apparatus for taking up seawater from the body of seawater comprises a water intake member extendible from the hull into the body of seawater, wherein the water intake is on the distal end of the water intake member.

11. The system of claim 8, wherein the water intake is movable such that the water intake system can intake water from various depths to reduce the intake of plankton.

12. The system of claim 8, wherein the first sea-going vessel comprises a sea chest formed in the lower portion of the hull of the first sea-going vessel and a water intake member extendible from the hull into the body of seawater, and the water intake system can utilize either the sea chest or the water intake member to intake seawater.

13. The system of claim 8, wherein the first sea-going vessel comprises at least one selected from the group consisting of (i) a means for regulating the salinity level of the concentrate to a level substantially equal to the salinity level of the seawater at the area where the concentrate is discharged and (ii) a means for regulating the temperature of the concentrate substantially equal to the temperature of the seawater at the area where the concentrate is discharged.

14. The system of claim 13, wherein the first sea-going vessel comprises both (i) the means for regulating the salinity level of the concentrate to a level substantially equal to the salinity level of the seawater at the area where the concentrate is discharged and (ii) the means for regulating the temperature of the concentrate substantially equal to the temperature of the seawater at the area where the concentrate is discharged.

15. A method of mixing seawater with a concentrate produced by a vessel-based desalination system positioned on the surface of a body of seawater, the method comprising the steps of:

introducing the concentrate into a concentrate discharge system installed on a first sea-going vessel and comprising at least one discharge member positionable in the body of seawater and comprising: (a) a conduit though which concentrate can flow from the water desalination system to the body of seawater and (b) an aspirator though which seawater from the body of seawater can be drawn into the discharge member to mix with concentrate in the conduit; and introducing into the conduit and mixing therein the concentrate and seawater from the body of seawater.

16. The method of claim 15, further comprising a step of diluting the concentrate with seawater on the vessel.

17. The method of claim 16, wherein the diluted concentrate has a salinity level substantially equal to the salinity level of the seawater at the area where the concentrate is discharged.

18. The method of claim 16, wherein the diluted concentrate has a temperature substantially equal to the temperature of the seawater at the area where the concentrate is discharged.

19. The method of claim 16, wherein the diluted concentrate has a salinity level substantially equal to the salinity level of the body of seawater at the area where the concentrate is discharged and the diluted concentrate has a temperature substantially equal to the temperature of the seawater at the area where the concentrate is discharged.

* * * * *